(12) United States Patent
Hanafusa et al.

(10) Patent No.: US 11,441,975 B2
(45) Date of Patent: Sep. 13, 2022

(54) CONTROLLING METHOD OF PREPROCESSING APPARATUS

(71) Applicant: SHIMADZU CORPORATION, Kyoto (JP)

(72) Inventors: Nobuhiro Hanafusa, Kyoto (JP); Masamitsu Shikata, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 215 days.

(21) Appl. No.: 15/322,527

(22) PCT Filed: Jul. 2, 2014

(86) PCT No.: PCT/JP2014/067709
§ 371 (c)(1),
(2) Date: Dec. 28, 2016

(87) PCT Pub. No.: WO2016/002032
PCT Pub. Date: Jan. 7, 2016

(65) Prior Publication Data
US 2017/0138824 A1  May 18, 2017

(51) Int. Cl.
*G01N 1/10* (2006.01)
*G01N 30/06* (2006.01)
(Continued)

(52) U.S. Cl.
CPC ............... *G01N 1/10* (2013.01); *B01L 3/502* (2013.01); *G01N 1/14* (2013.01); *G01N 1/34* (2013.01);
(Continued)

(58) Field of Classification Search
CPC .. G01N 1/10; G01N 1/14; G01N 1/34; G01N 1/4005; G01N 30/06; G01N 35/0099;
(Continued)

(56) References Cited

U.S. PATENT DOCUMENTS 4,805,469 A  2/1989  Commarmot
5,305,650 A  4/1994  Koike et al.
(Continued)

FOREIGN PATENT DOCUMENTS

CN  102135476 A  7/2011
EP     2348322 A2  7/2011
(Continued)

OTHER PUBLICATIONS

Communication dated Jul. 30, 2018, issued by the State Intellectual Property Office of the P.R.C. in corresponding Chinese Application No. 201480080145.5.
(Continued)

*Primary Examiner* — Benjamin R Whatley
(74) *Attorney, Agent, or Firm* — Sughrue Mion, PLLC

(57) ABSTRACT

A preprocessing apparatus uses preprocessing kits prepared for samples, respectively, sets the preprocessing kits in plural processing ports provided so as to correspond to preprocessing items, and executes a predetermined preprocessing item. A controller which controls operations of a carrying mechanism holding and carrying the preprocessing kits, and processing parts executing the preprocessing items in the respective processing ports, includes a processing-state control part, a random access part, and a preprocessing part. The random access part is configured to check availability of a preprocessing port corresponding to a preprocessing item to be executed on a sample contained in a preprocessing kit, and set the preprocessing kit in a processing port if the processing port is available as a processing port corresponding to the preprocessing item. The preprocessing part executes a corresponding preprocessing item on a sample in a preprocessing kit when the preprocessing kit is set in the processing port.

13 Claims, 13 Drawing Sheets

(51) Int. Cl.
*G01N 1/34* (2006.01)
*G01N 35/02* (2006.01)
*G01N 1/40* (2006.01)
*G01N 35/00* (2006.01)
*B01L 3/00* (2006.01)
*G01N 1/14* (2006.01)
*G01N 35/04* (2006.01)

(52) U.S. Cl.
CPC .......... *G01N 1/4005* (2013.01); *G01N 30/06* (2013.01); *G01N 35/0099* (2013.01); *G01N 35/025* (2013.01); *B01L 2200/0631* (2013.01); *G01N 2001/4011* (2013.01); *G01N 2035/00485* (2013.01); *G01N 2035/00534* (2013.01); *G01N 2035/0427* (2013.01); *G01N 2035/0441* (2013.01); *G01N 2035/0443* (2013.01)

(58) Field of Classification Search
CPC ......... G01N 35/025; G01N 2001/4011; G01N 2035/00485; G01N 2035/00534; G01N 2035/0427; G01N 2035/0441; G01N 2035/0443; B01L 3/502; B01L 2200/0631
See application file for complete search history.

(56) References Cited

U.S. PATENT DOCUMENTS

| | | |
|---|---|---|
| 2004/0120860 A1 | 6/2004 | Ingenhoven |
| 2009/0035866 A1 | 2/2009 | Wilson |
| 2011/0104026 A1 | 5/2011 | Yoon et al. |
| 2011/0157580 A1 | 6/2011 | Nogami et al. |
| 2011/0176976 A1* | 7/2011 | Ebi .................. G01N 35/04 422/547 |
| 2011/0291004 A1 | 12/2011 | Kanda et al. |
| 2012/0134895 A1 | 5/2012 | Kanda et al. |
| 2013/0230908 A1 | 9/2013 | Shoji et al. |
| 2015/0051383 A1* | 2/2015 | Doucette .............. G01N 1/4077 530/419 |

FOREIGN PATENT DOCUMENTS

| | | |
|---|---|---|
| JP | 04-099477 A | 3/1992 |
| JP | 04-164257 A | 6/1992 |
| JP | 2003-339374 A | 12/2003 |
| JP | 2007-033414 A | 2/2007 |
| JP | 2010-060474 A | 3/2010 |
| JP | 2012-100549 A | 5/2012 |
| JP | 2013-003003 A | 1/2013 |
| JP | 3188929 U | 2/2014 |
| WO | 2009/072400 A1 | 6/2009 |
| WO | 2010/087387 A1 | 8/2010 |
| WO | 2011/019032 A1 | 2/2011 |

OTHER PUBLICATIONS

Communication dated Feb. 5, 2018 from the European Patent Office in counterpart application No. 14896680.7.
International Search Report of PCT/JP2014/067709 dated Oct. 7, 2014.
Communication dated Jun. 25, 2019, from the European Patent Office in counterpart European Application No. 14896680.7.

* cited by examiner

CONTROLLING METHOD OF PREPROCESSING APPARATUS

CROSS REFERENCE TO RELATED APPLICATIONS

This application is a National Stage of International Application No. PCT/JP2014/067709 filed Jul. 2, 2014, the contents of which are incorporated herein by reference in their entirety.

TECHNICAL FIELD

The present invention relates to a preprocessing apparatus which automatically performs preprocessing such as extraction processing in which a specific component unnecessary for analysis, out of components contained in a sample of biological origin such as whole blood, serum, blood plasma, blood in a filter paper, or urine, is removed, and a necessary component is extracted as a sample.

BACKGROUND ART

In performing quantitative analysis on a sample such as a sample of biological origin, processing of removing a specific component unnecessary for analysis from the sample of biological origin and extracting a necessary component as a sample, and drying/solidifying processing of concentrating or drying/solidifying an extracted sample, should be performed in some cases. Conventionally, various apparatuses, each serving as a preprocessing apparatus which automatically performs the above-stated preprocessing, have been proposed and implemented (for example, refer to Patent Document 1).

For example, Patent Document 1 discloses that a plurality of cartridges holding a separation agent for dipping a sample and separating a specific component from the sample are held by a common carrying mechanism, the cartridges are sequentially placed in a pressure applying mechanism provided in a predetermined position by the carrying mechanism, and a pressure is applied to the cartridges in the pressure applying mechanism so that the sample is extracted. In this case, a plurality of extract receivers which receive extracts from the cartridges are moved relative to the cartridges below the cartridges by another carrying mechanism different from the carrying mechanism for the cartridges, to be sequentially placed in the pressure applying mechanism, so that extraction of the sample is successively performed.

PRIOR ART DOCUMENTS

Patent Documents

Patent Document 1: Japanese Patent Laid-open Publication No. 2010-60474

SUMMARY OF THE INVENTION

Problems to be Solved by the Invention

In the above-described way, the carrying mechanisms for the cartridges and the extract receivers cannot be moved during extraction processing of a sample in the pressure applying mechanism, thus, there is a limit to what can be done for improvement of a throughput. The same holds true for a case where the number of pressure applying mechanisms is increased.

In view of the foregoing matters, an object of the present invention is to improve a throughput in preprocessing performed on a plurality of samples.

Solutions to the Problems

A preprocessing apparatus according to the present invention includes: a carrying mechanism which includes a holding part holding a preprocessing kit which is prepared for each sample and has an internal space containing a sample, and carries the preprocessing kit by moving the holding part; a preprocessing-kit setting part which sets the preprocessing kit in a position along a track of the holding part; processing ports which are provided in plural positions along a track of the holding part, for setting the preprocessing kit, and are each provided so as to correspond to a preprocessing item to be executed on a sample; a processing part which executes a corresponding preprocessing item on a sample in the preprocessing kit set in each of the processing ports; and a controller which controls operations of the carrying mechanism, the preprocessing-kit setting part, and the processing part. The controller includes a processing-state control part, a random access part, and a preprocessing part. The processing-state control part controls a state of preprocessing performed in each of the processing ports and controls availability of each of the processing ports. The random access part is configured to check availability of the processing port corresponding to a preprocessing item to be executed on a sample contained in the preprocessing kit, and set the preprocessing kit in the processing port when the processing port is available as the processing port corresponding to the preprocessing item. The preprocessing part executes a corresponding preprocessing item on the sample in the preprocessing kit when the preprocessing kit is set in the preprocessing port.

Effects of the Invention

The preprocessing apparatus according to the present invention is configured in such a way that: a preprocessing kit prepared for each sample is used; processing ports are provided so as to correspond to preprocessing items which should be executed on samples, in plural positions along a track of a holding part of a carrying mechanism; availability of a preprocessing port corresponding to a preprocessing item which should be executed on a sample contained in the preprocessing kit, is checked; and if there is a processing port available as a processing port corresponding to the preprocessing item, the preprocessing kit is set in the processing port so that the preprocessing item is executed. Thus, preprocessing of a plurality of samples can be individually performed in parallel and concurrently. As a result of this, a throughput in preprocessing is improved.

EMBODIMENTS OF THE INVENTION

Figure 1:
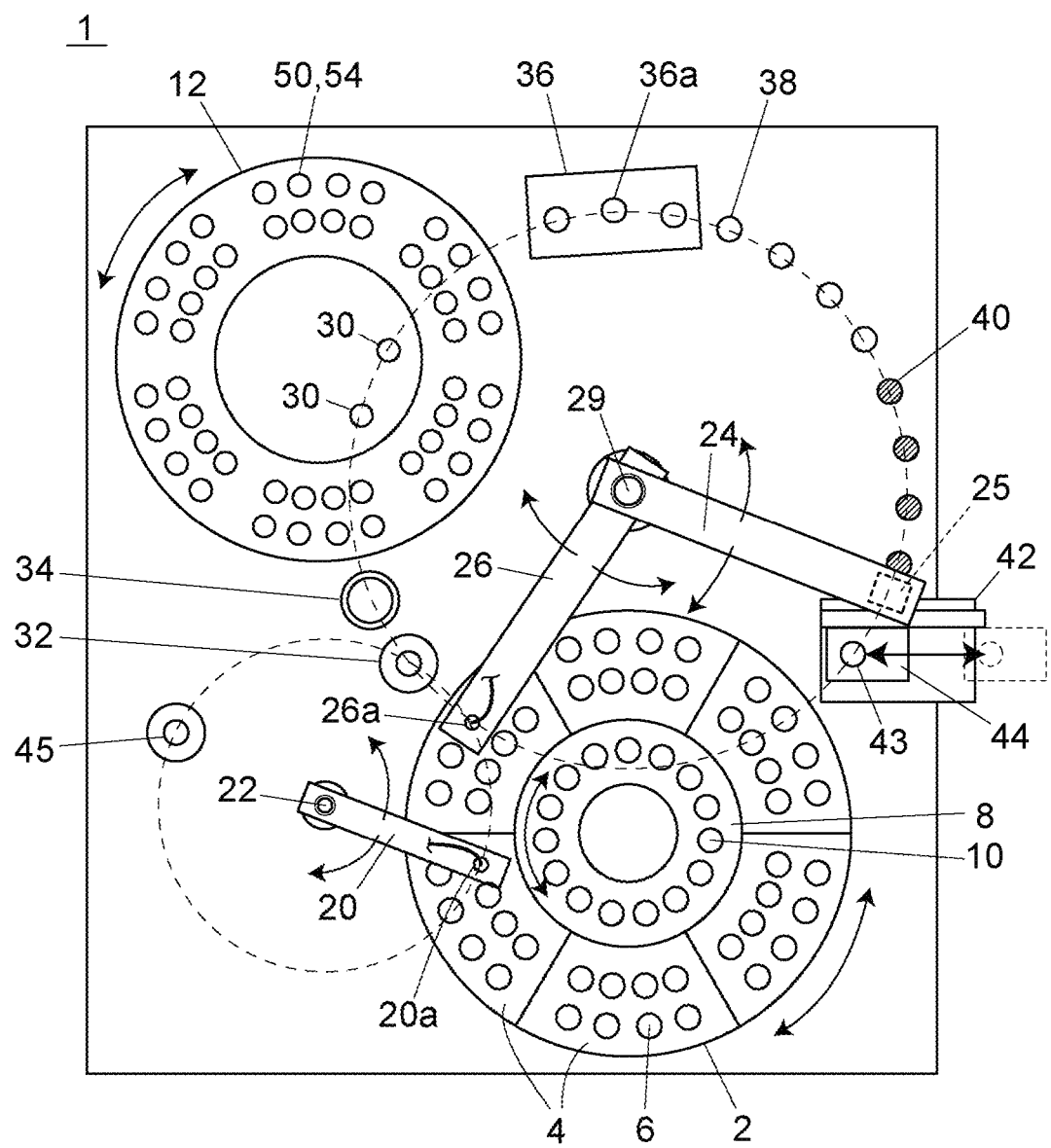
FIG. 1 is a plan view showing one embodiment of a preprocessing apparatus.

Preferably, a preprocessing kit used in a preprocessing apparatus according to the present invention has an internal space in which a sample is contained, and includes, in the internal space: a separation device which includes a separation agent or a separation membrane for dipping a sample and separating a specific component in the sample from the sample, and an extraction outlet provided below the separation agent or the separation membrane, through which the sample dipped in the separation agent or the separation membrane is extracted; and a collecting container which is attached to and detached from the separation device and has an internal space in which a lower portion of the separation device is contained and a sample extracted through the extraction outlet is collected when the collecting container is attached to the separation device. In such a case, further included are: a plurality of filtration ports serving as the processing ports for setting the preprocessing kit in which a lower portion of the separation device is contained in the collecting container; and a pressure applying part serving as the processing part for applying a pressure to a sample in the preprocessing kit set in the filtration port in such a manner that a sample in the separation device set in the filtration port is extracted to be provided from the extraction outlet to the collecting container through the separation agent or the separation membrane. As a result of this, extraction can be performed for each sample in the plurality of filtration ports, so that a throughput in extraction of a sample can be improved.

Further, in the structure disclosed in Patent Document 1, the extract receivers are always placed below the cartridges, so that it is not easy to take a sample extracted to be in the extract receiver, which necessitates a more complicated mechanism for taking an extracted sample. In contrast thereto, according to the present invention, the preprocessing kit includes the separation device and the collecting container, and the collecting container is attachable to and detachable from the separation device, so that the collecting container which is detached from the separation device can be dealt with after an extracted sample is provided from the separation device to the collecting container, which facilitates collection of an extracted sample.

Preferably, each of the separation device and the collecting container includes a flange part which is a circumferential expansion of an outer circumferential surface, and in the carrying mechanism, the holding part is configured to be engaged with each of the flange parts of the separation device and the collecting container, and to hold and carry the separation device and the collecting container individually. Thus, the holding part of the carrying mechanism can carry the separation device and the collecting container separately with a simple structure.

According to a preferred embodiment in a case where the plurality of filtration ports are provided, priorities are assigned to the filtration ports, and the random access part is configured so as to use the filtration ports in descending order of priority when some of the plurality of filtration ports are available. As a result of this, it is easy to determine which of filtration ports should be used when some of the plurality of filtration ports are available.

Preferably, further included are: a stirring port which serves as the processing port for setting the separation device containing a sample solution; and a stirring mechanism which serves as the processing part for causing the separation device set in the stirring port to periodically move in a horizontal plane, to stir a sample solution in the separation device. Thus, it is possible to automatically stir a sample solution in the separation device.

Preferably, the plurality of filtration ports are provided, and the stirring mechanism is provided individually for each of the filtration ports. Thus, in a case where a sample should be stirred, the separation device is carried to the stirring port if the stirring port is available, so that the sample can be stirred in each of stirring ports independently. Accordingly, it is possible to stir a plurality of samples in parallel and concurrently, but at different points in time, which improves a throughput in preprocessing of a sample.

Preferably, further included is a sample transfer part which includes a transfer port for setting the collecting container containing an extracted sample which is provided from the separation device, and a port moving mechanism for moving the transfer port to an outside of the preprocessing apparatus, and places the collecting container set in the transfer port outside the preprocessing apparatus, to allow a sample injecting apparatus provided adjacent to the preprocessing apparatus to suck a sample from the collecting container. Thus, a sample which has been subjected to preprocessing can be automatically taken by the sample injecting apparatus adjacent to the preprocessing apparatus, so that processing from preprocessing of a sample to analysis can be automated.

Preferably, a drying/solidifying mechanism for supplying a drying/solidifying gas to the collecting container set in the filtration port individually is further included as the processing part, and the preprocessing part is configured to perform drying/solidifying processing in which the drying/solidifying gas is blown to a sample in the collecting container after extraction processing of a sample which should be concentrated or dried and solidified. Thus, drying/solidifying or concentration of a sample can be achieved in the filtration port, following extraction of the sample in the collecting container, so that efficiency in preprocessing can be improved.

A preferred embodiment of the drying/solidifying mechanism includes a plurality of drying/solidifying-gas supply nozzles which are provided so as to correspond to the filtration ports, respectively, and spout drying/solidifying gases from tips thereof, and the preprocessing part is configured so as to perform drying/solidifying processing in which the drying/solidifying-gas nozzle is placed on an opening in an upper surface of the collecting container of the corresponding filtration port with the use of the carrying mechanism, and the drying/solidifying gas is blown to a sample in the collecting container from the tip of the drying/solidifying-gas supply nozzle. As a result of this, it is possible to place the drying/solidifying-gas supply nozzle for blowing the drying/solidifying gas to a sample in the collecting container, on the collecting container with the use of the carrying mechanism, without providing a dedicated mechanism, so that complication or increase in size of a structure of the apparatus can be prevented.

Preferably, further included are: a dispensation port which is provided in a position along a track of the holding part, for setting the separation device being unused; a sample setting part which holds a plurality of sample containers each containing a sample, moves the sample containers in a horizontal plane, and places a desired sample container in a predetermined sampling position; and a sampling part which sucks a sample from the sample container placed in the sampling position, and dispenses the sample to the separation device set in the dispensation port. Thus, it is unnecessary for an analyst to manually dispense sample to the separation device.

A preferred embodiment of the above-described sampling part includes a sampling arm which holds a nozzle for sucking and dispensing a sample, on a tip side in such a manner that the tip of the nozzle is oriented vertically downward, and rotates about a base end thereof in a horizontal plane, to move the nozzle in such a manner that the nozzle makes an arc-shaped track.

Preferably, further included are: a reagent setting part which holds a plurality of reagent containers each containing a reagent to be added to a sample, moves the reagent containers in a horizontal plane, and places a desired reagent container in a predetermined reagent taking position; and a reagent addition part which sucks a reagent from the reagent container set in the reagent taking position and dispenses the reagent to the separation device set in the dispensation port. Thus, addition of a reagent to a sample in the dispensation port where a sample has been dispensed to the separation device is automatically performed, so that a throughput in preprocessing can be further improved.

A preferred embodiment of the above-described reagent addition part includes a reagent arm which holds a nozzle for sucking and dispensing a reagent, on a tip side in such a manner that the tip of the nozzle is oriented vertically downward, and rotates about a base end thereof in a horizontal plane, to move the nozzle in such a manner that the nozzle makes an arc-shaped track.

A preferred embodiment of the carrying mechanism includes a carrying arm which includes the holding part on a tip side, and rotates about a base end thereof in a horizontal plane, to move the holding part in such a manner that the holding part makes an arc-shaped track.

One embodiment of the preprocessing apparatus will be described with reference to FIG. 1.

A preprocessing apparatus 1 according to this embodiment executes a necessary preprocessing item by using one set of prepared preprocessing kits each including a set of a separation device 50 and a collecting container 54, for each sample. In the preprocessing apparatus 1, a plurality of processing ports for executing respective preprocessing items are provided, and a preprocessing kit containing a sample is set in any of the processing ports so that a preprocessing item corresponding to the processing port is executed on the sample contained in the preprocessing kit. Each of the processing ports will be described later. A preprocessing item is an item of preprocessing which is necessary for executing an analysis item designated by an analyst.

The separation device 50 and the collecting container 54 which form the preprocessing kit are carried by a carrying arm 24 forming a carrying mechanism. The carrying arm 24 includes a holding part 25 for holding the separation device 50 and the collecting container 54 on a tip side, and rotates about a vertical shaft 29 holding a base end of the carrying arm 24, in a horizontal plane in such a manner that the holding part 25 makes an arc-shaped track. All the processing ports and other ports to which the separation device 50 and the collecting container 54 are to be carried are provided along the arc-shaped track made by the holding part 25.

A sample setting part 2 for setting sample containers 6 each containing a sample is provided, and a sampling arm 20 is provided near the sample setting part 2. The sampling arm 20 is a sampling part for taking a sample from a sample container set in the sample setting part 2. In the sample setting part 2, sample racks 4 which hold the plurality of sample containers 6 are annularly arranged. The sample setting part 2 rotates in a horizontal plane so as to circumferentially move the sample racks 4, and a desired one of the sample containers 6 is placed in a predetermined sampling position by rotation of the sample setting part 2. The sampling position is a position along a track of a sampling nozzle 20a provided at a tip of the sampling arm 20, where the sampling nozzle 20a takes a sample.

A vertical shaft 22 penetrates a base end of the sampling arm 20, and the sampling arm 20 rotates about the shaft 22 in a horizontal plane and moves upward and downward in a vertical direction along the shaft 22. The sampling nozzle 20a which is held on a tip side of the sampling arm 20 in such a manner that a tip of the sampling nozzle 20a is oriented vertically downward, is moved so as to make an arc-shaped track in a horizontal plane, and is moved upward and downward in a vertical direction by the sampling arm 20.

A dispensation port 32 is provided in a position on the track of the sampling nozzle 20a and on the track of the holding part 25 of the carrying arm 24. The dispensation port 32 is a port where the sampling nozzle 20a dispenses a sample to the separation device 50 being unused. The separation device 50 being unused is set in the dispensation port by the carrying arm 24.

On an inner side of the sample setting part 2, a reagent setting part 8 for setting a reagent container 10 is provided, and a reagent arm 26 (reagent addition part) for taking a reagent from the reagent container set in the reagent setting part 8, is provided. A base end of the reagent arm 26 is held by the vertical shaft 29 shared with the carrying arm 24, and the reagent arm 26 rotates in a horizontal plane and moves upward and downward. A reagent addition nozzle 26a is provided at a tip of the reagent arm 26 in such a manner that a tip of the reagent addition nozzle 26a is oriented vertically downward, and the reagent addition nozzle 26a moves in a horizontal plane so as to make the same arc-shaped track that the holding part 25 of the carrying arm 24 makes, and moves upward and downward.

The reagent setting part 8 rotates in a horizontal plane independently of the sample setting part 2. In the reagent setting part 8, a plurality of the reagent containers 10 are annularly placed, and as a result of rotation of the reagent setting part 8, the reagent containers 10 are carried in a direction of the rotation, so that a desired one of the reagent containers 10 is placed in a predetermined reagent taking position. A reagent taking position is a position along a track of the reagent addition nozzle 26a of the reagent arm 26, where the reagent addition nozzle 26a takes a reagent. The reagent addition nozzle 26a sucks a predetermined reagent, and then dispenses the sucked reagent to the separation device 50 set in the dispensation port 32, to achieve addition of the reagent to the sample.

A preprocessing-kit setting part 12 is provided in a position different from positions where the sample setting part and the reagent setting part 8 are provided. The preprocessing-kit setting part 12 is configured to allow a plurality of preprocessing kits each including a set of the separation device 50 and the collecting containers 54 which are unused and stacked, to be annularly arranged. The preprocessing-kit setting part 12 rotates in a horizontal plane and moves the preprocessing kits circumferentially, to place a set in an arbitrary preprocessing kit in a position along the track of the holding part 25 of the carrying arm 24. The carrying arm 24 can hold the separation device 50 or the collecting container 54 which is unused and placed in a position along the track of the holding part 25.

An analyst can set plural types (two types, for example) of separation devices 50 in which separation agents having different separation performances are respectively provided, in the preprocessing-kit setting part 12. Those separation devices 50 are used selectively in accordance with each analysis item of a sample, and one of the separation devices 50 which complies with an analysis item designated by the analyst is selected by the preprocessing-kit setting part 12. Appropriate selection of the separation device 50 is achieved by a controller which controls operations of the preprocessing apparatus 1. The controller will be described later. The term "analysis item" in this specification part a kind of analysis which is to be performed by successively using a sample subjected to preprocessing in the preprocessing apparatus 1. As an analysis apparatus which performs such analysis, a liquid chromatograph (LC) or a liquid chromatograph/mass spectrometer (LC/MS), for example, can be cited.

The separation device 50 and the collecting container 54 which form the preprocessing kit will be described with reference to FIGS. 2A, 2B, and 2C.

Figure 2A:
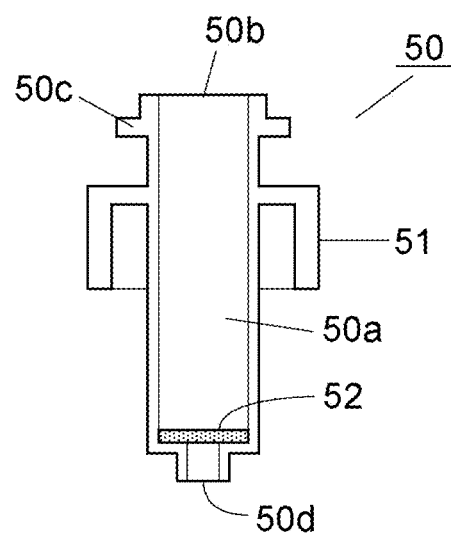
FIG. 2A is a cross-sectional view showing an example of a separation device of a preprocessing kit.

As shown in FIG. 2A, the separation device 50 is a cylindrical container having an internal space 50a in which a sample or a reagent is contained. In a bottom of the internal space 50a, a separation agent 52 is provided. The separation agent 52 has a function of separating selectively a specific component in a sample by physically or chemically reacting with the specific component in the sample which is dipped. As the separation agent 52, an ion-exchange resin, a silica gel, cellulose, activated carbon, and the like can be used. Additionally, in place of the separation agent 52, a separation membrane having a similar property can alternatively be used. As a separation membrane, a poly-tetrafluoroethylene (PTFE) membrane, a nylon membrane, a polypropylene membrane, a polyvinylidene-fluoride (PVDF) membrane, an acrylic copolymer membrane, a mixed cellulose membrane, a nitrocellulose membrane, a polyether-sulfone membrane, an ion-exchange membrane, a glass-fiber membrane, and the like, can be used.

In the separation device 50, an opening 50b for injecting a sample or a reagent is provided in an upper surface, and an extraction outlet 50d for extracting a liquid resulted from dipping in the separation agent 52 is provided in a lower surface. Further, a flange part 50c which circumferentially protrudes is provided to be engaged with the holding part 25 of the carrying arm 24 later described, in an upper portion of an outer circumferential surface.

A skirt part 51 which circumferentially protrudes, extends downward by a fixed distance, and surrounds an outer circumferential surface, is provided below the flange part 50c. As will be later described, the skirt part 51 comes into intimate contact with an edge of a filtration port 30 of a processing part 28, to form a sealed space in the skirt part 51 when the skirt part 51 together with the collecting container 54 is contained in the filtration port 30.

Figure 2B:
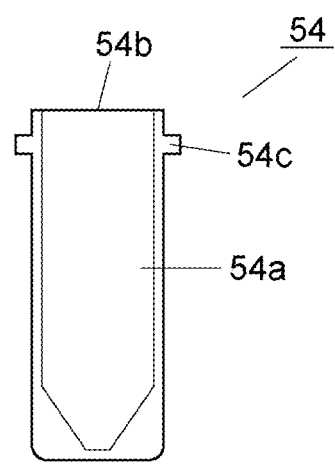
FIG. 2B is a cross-sectional view showing an example of a collecting container of a preprocessing kit.
Figure 2C:
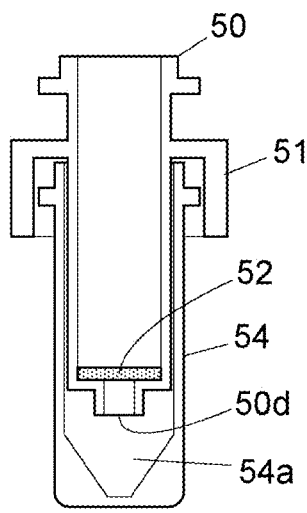
FIG. 2C is a cross-sectional view showing a preprocessing kit in which a collecting container is attached to a separation device.

As shown in FIGS. 2B and 2C, the collecting container 54 is a cylindrical container which contains a lower portion of the separation device 50 and collects an extract which is provided from the extraction outlet 50d of the separation device 50. The collecting container 54 includes an opening 54b into which the lower portion of the separation device 50 is inserted, in an upper surface thereof, and also includes a space 54a which contains a portion of the separation device 50 which is located below the skirt part 51. The collecting container 54, similarly to the separation device 50, includes a flange part 54c which circumferentially protrudes to be engaged with the holding part 25 of the carrying arm 24 in an upper portion of an outer circumferential surface thereof.

An upper portion of the collecting container 54 enters into the skirt part 51 when the collecting container 54 is attached to the separation device 50. An outer diameter of the separation device 50 and an inner diameter of the collecting container 54 are designed so as to leave a small clearance between an outer circumferential surface of the separation device 50 and an inner circumferential surface of the collecting container 54 when the separation device 50 is contained in the internal space 54a of the collecting container 54. The separation device 50 and the collecting container 54 are set in the preprocessing-kit setting part 12 with the lower portion of the separation device 50 being contained in the collecting container 54 (in a state shown in FIG. 2C).

Figure 3:
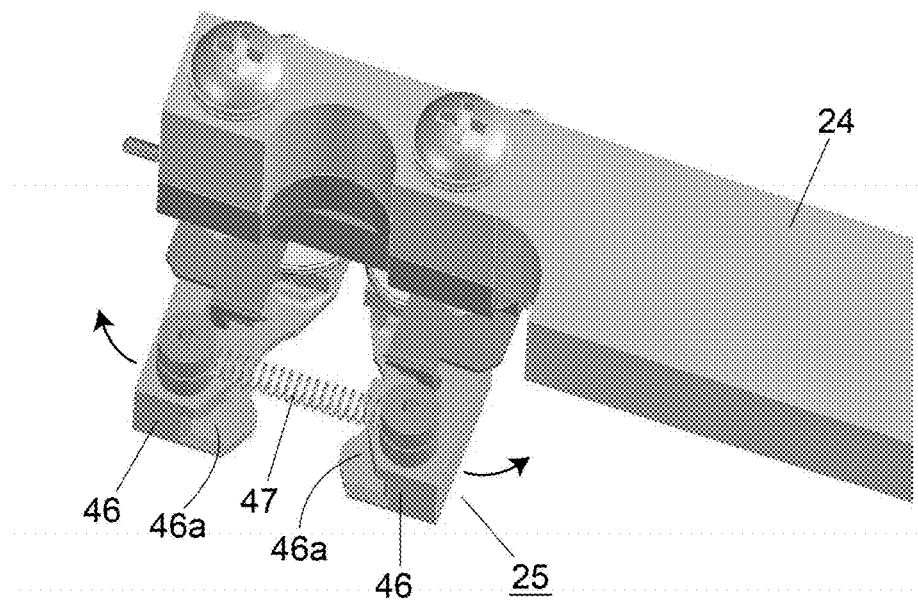
FIG. 3 is a perspective view of a tip of a carrying arm, for showing a structure of a holding part of the carrying arm.

Next, a structure of the holding part 25 of the carrying arm 24 will be described with reference to FIG. 3.

The holding part 25 includes two finger parts 46 which hold the flange part 50c of the separation device 50 or the flange part 54c of the collecting container 54. The finger parts 46 horizontally protrude in a direction substantially perpendicular to the carrying arm 24 at a tip of the carrying arm 24. The two finger parts 46 are spaced from each other and connected with each other via a coil spring 47. The two finger parts 46 can be freely opened and closed in a horizontal direction, and can hold the flange part 50c or 54c of the separation device 50 or the collecting container 54 which is interposed between the finger parts 46, by virtue of an elastic force of the coil spring 47. A groove 46a by which a side edge of the flange part 50c or 54c is slidably held is provided in an inner side surface of each of the two finger parts 46.

The inner side surface of each of the two finger parts 46 has a curved shape so that a distance between the two finger parts 46 is smaller than an outer diameter of a body portion of each of the separation device 50 and the collecting container 54 at a tip, and is almost equal to, or larger than, an outer diameter of the body portion of each of the separation device 50 and the collecting container 54 in a position between a tip and a base end (such a position will be referred to as a "holding position"). Also, the inner side surface of the tip of each of the two finger parts 46 has a smoothly curved shape so that the tip can slide along a shape of the separation device 50 or the collecting container 54 when the finger parts 46 are pushed against the separation device 50 or the collecting container 54. Because of the above-described shape, to simply push the finger parts 46 against the separation device 50 or the collecting container 54 while rotating the carrying arm 24 counterclockwise (left-handed) would automatically open the finger parts 46 along a circumferential surface of the body portion of the separation device 50 or the collecting container 54, and would automatically close the finger parts 46 by virtue of an elastic force of the coil spring 47 when the separation device 50 or the collecting container 54 is located in a holding position between tips and base ends of the finger parts 46, so that the separation device 50 or the collecting container 54 can be stably held.

In order to set the separation device 50 or the collecting container 54 which is being held, in any of the ports, it is required to simply rotate the carrying arm 24 clockwise (right-handed) with the lower portion of the separation device 50 or the collecting container 54 which is being held, being contained in a port where the separation device 50 or the collecting container 54 is to be set. To rotate the carrying arm 24 clockwise with the separation device 50 or the collecting container 54 being contained in a port would automatically open the finger parts 46 along a circumferential surface of the body portion of the separation device 50 or the colleting container 54 because of the curved shape of the inner side surface of each of the two finger parts 46, so that the separation device 50 or the collecting container 54 is released from a hold.

Because of the above-described structure of the holding part 25, an operation for carrying the separation device 50 or the collecting container 54 is performed as follows.

First, the finger parts 46 are placed beside the flange part 50c or 54c of the separation device 50 or the collecting container 54 which is to be carried, and the carrying arm 24 is rotated counterclockwise so that the flange part 50c or 54c slides along the grooves 46a in respective inner side surfaces of the two finger parts 46. As a result of this, the holding part 25 stably holds the flange part 50c or 54c of the separation device 50 or the collecting container 54. Thereafter, the carrying arm 24 is caused to move, and the separation device 50 or the collecting container 54 is set in a port which is a destination.

After the separation device 50 or the collecting container 54 is set in the port which is a destination, the carrying arm 24 is rotated clockwise, so that the separation device 50 or the collecting container 54 is released from a hold. As a result of this, carrying of the separation device 50 or the collecting container 54 is finished, and the separation device 50 or the collecting container 54 is set in the port which is a destination.

Description will be made by referring back to FIG. 1. As processing ports each of which contains a preprocessing kit and is used for executing a specific preprocessing item, filtration ports 30, stirring ports 36a, a temperature adjustment port 38 for the separation device 50, and a temperature adjustment port 40 for the collecting container 54 are provided. The filtration ports 30 are provided in two positions on an inner side of the preprocessing-kit setting part 12. Three stirring ports 36a in a stirring part 36 are provided near the preprocessing-kit setting part 12. Four temperature adjustment ports 38 and four temperature adjustment ports 40 which are placed and aligned on an arc.

Each of the filtration ports 30 is connected with a negative-pressure applying mechanism 55 serving as a pressure applying part (refer to FIGS. 4A and 4B), and the negative-pressure applying mechanism 55 is configured so as to apply a negative pressure to a preprocessing kit set in the filtration port 30. The stirring part 36 includes a mechanism which causes each of the stirring ports 36a to periodically operate in a horizontal plane individually, and serves to stir a sample solution in the separation device 50 placed in each of the stirring ports 36a. Each of the temperature adjustment ports 38 and 40 is provided in a thermally-conductive block, a temperature of which is controlled by a heater and a Peltier element, for example, contains the separation device 50 or the collecting container 54, and adjusts a temperature of the separation device 50 or the collecting container 54 at a certain temperature.

Figure 4A:
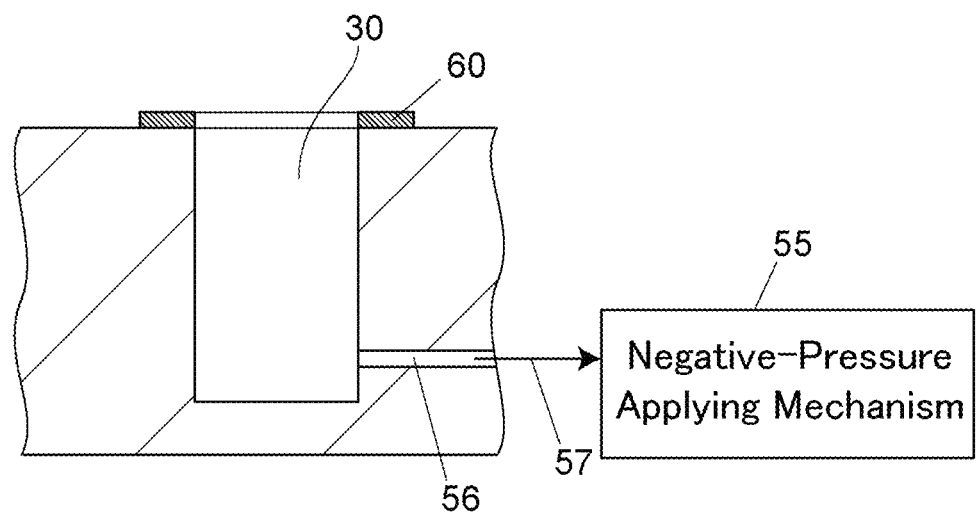
FIG. 4A is a cross-sectional configuration diagram showing a structure of a filtration port.

The filtration port 30 will be described with reference to FIGS. 4A and 4B.

The filtration port 30 includes a recess part in which the separation device 50 and the collecting container 54 are contained with the lower portion of the separation device 50 being contained in the collecting container 54. At an edge of the filtration port 30, a ring-shaped sealing member 60 having elasticity is provided. A material of the sealing member 60 is an elastic material such as silicon rubber or ethylene-propylene-diene (EPDM) rubber. As shown in FIG. 4B, when the separation device 50 and the collecting container 54 are contained in the filtration port 30 with the lower portion of the separation device 50 being contained in the collecting container 54, a lower end of the skirt part 51 of the separation device 50 comes into contact with the sealing member 60, so that a space surrounded by an inner side surface of the skirt part 51 and an inner side surface of the filtration port 30 is sealed.

The inner side surface of the filtration port 30 is connected with the negative-pressure applying mechanism 55 via a flow path 56. The negative-pressure applying mechanism 55 serves to apply a negative pressure to the filtration port 30 with the use of a vacuum pump while details of a structure of the negative-pressure applying mechanism 55 will be provided later.

As a result of a negative pressure being applied to the filtration port 30 by the negative-pressure applying mechanism 55 with the separation device 50 and the collecting container 54 being contained in the filtration port 30, the space surrounded by the inner side surface of the skirt part 51 and the inner side surface of the filtration port 30 is decompressed. This decompressed space communicates with the internal space 54a of the collecting container 54. An upper surface of the separation device 50 is open to air, so that a difference in pressure is produced between the internal space 50a of the separation device 50 and the internal space 54a of the collecting container 54 with the separation agent 52 being interposed therebetween. Then, only a component which can pass through the separation agent 52 in a sample solution contained in the internal space 50a of the separation device 50 is extracted to be in the internal space 54a of the collecting container 54 due to the difference in pressure.

Figure 5:
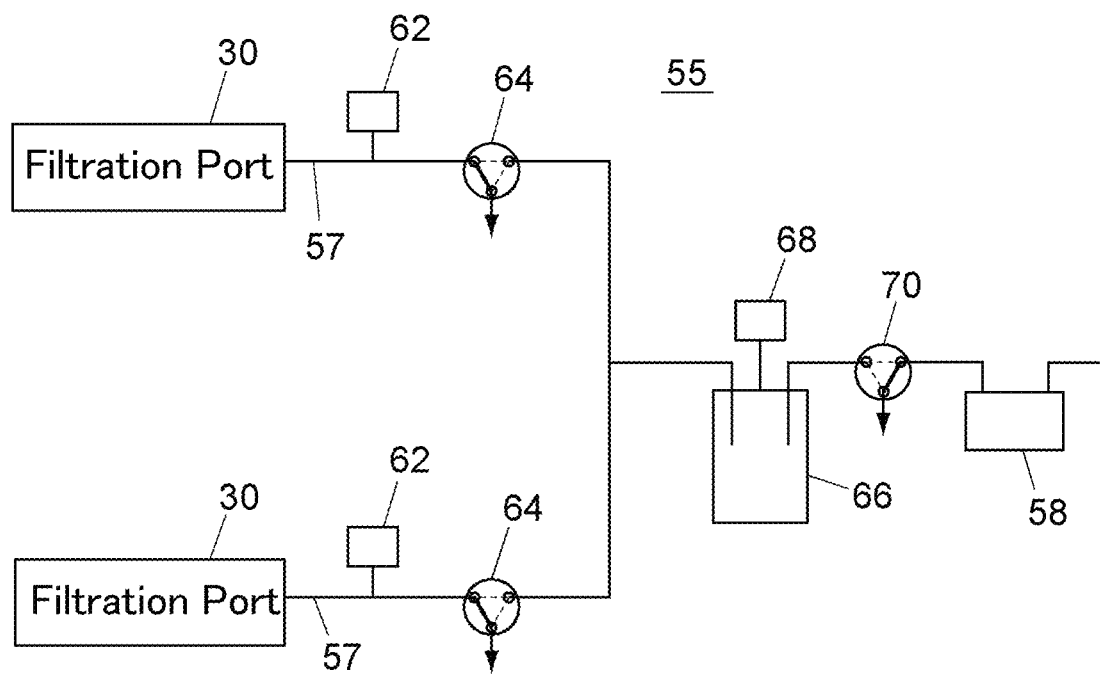
FIG. 5 is a schematic flow-path configuration diagram showing a configuration of a negative-pressure applying mechanism.

FIG. 5 shows an example of the negative-pressure applying mechanism 55.

The two filtration ports 30 are connected with a common vacuum tank 66. Each of the flow paths 57 which connect the filtration ports 30 and the vacuum tank 66, respectively, includes a pressure sensor 62 and a three-way valve 64. The pressure sensor 62 senses a pressure of the filtration port 30. The three-way valve 64 can select a state among a state where the filtration port 30 and the vacuum tank 66 are connected, a state where an end of the flow path 57 closer to the filtration port 30 is open to air (a state shown in FIG. 5), and a state where an end of the flow path 57 closer to the filtration port 30 is sealed.

The vacuum tank 66 is connected with a pressure sensor 68 and is further connected with a vacuum pump 58 via a three-way valve 70, and connection between the vacuum tank 66 and the vacuum pump 58 is established as necessary so that a pressure in the vacuum tank 66 can be adjusted.

In performing extraction processing on a sample in any one of the filtration ports 30, the filtration port 30 is connected with the vacuum tank 66 and a value of the pressure sensor 62 which senses a pressure of the filtration port 30 is adjusted to a predetermined value, and thereafter, an end of the flow path 57 closer to the filtration port 30 is sealed. As a result of this, the filtration port 30 becomes a sealed system, so that an inside of the filtration port 30 is kept decompressed and a sample can be extracted.

Figure 6A:
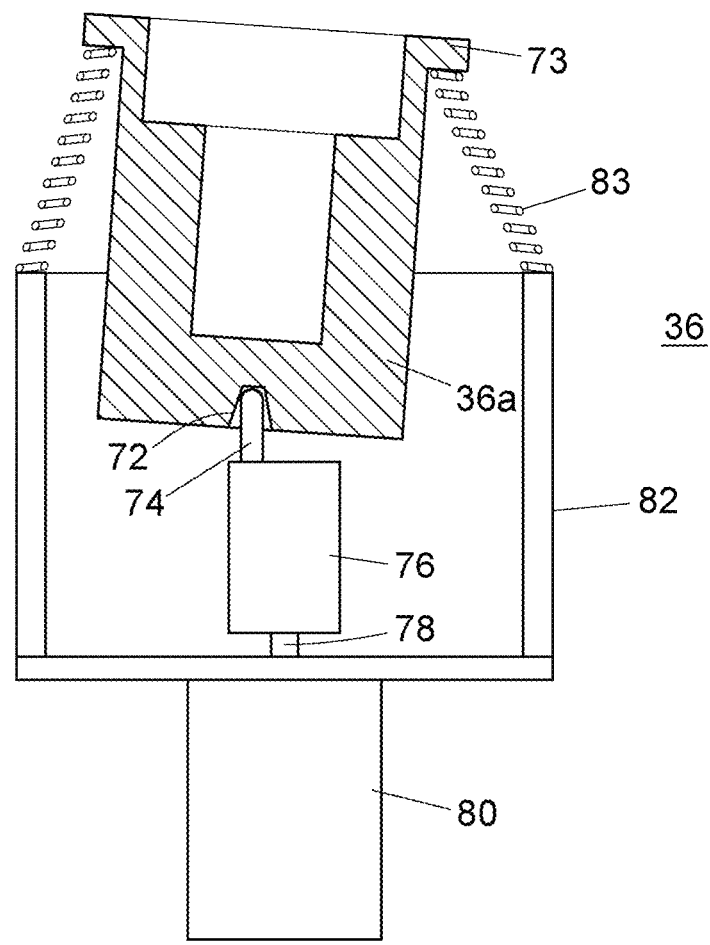
FIG. 6A is a cross-sectional configuration diagram showing a structure of a stirring part.
Figure 6B:
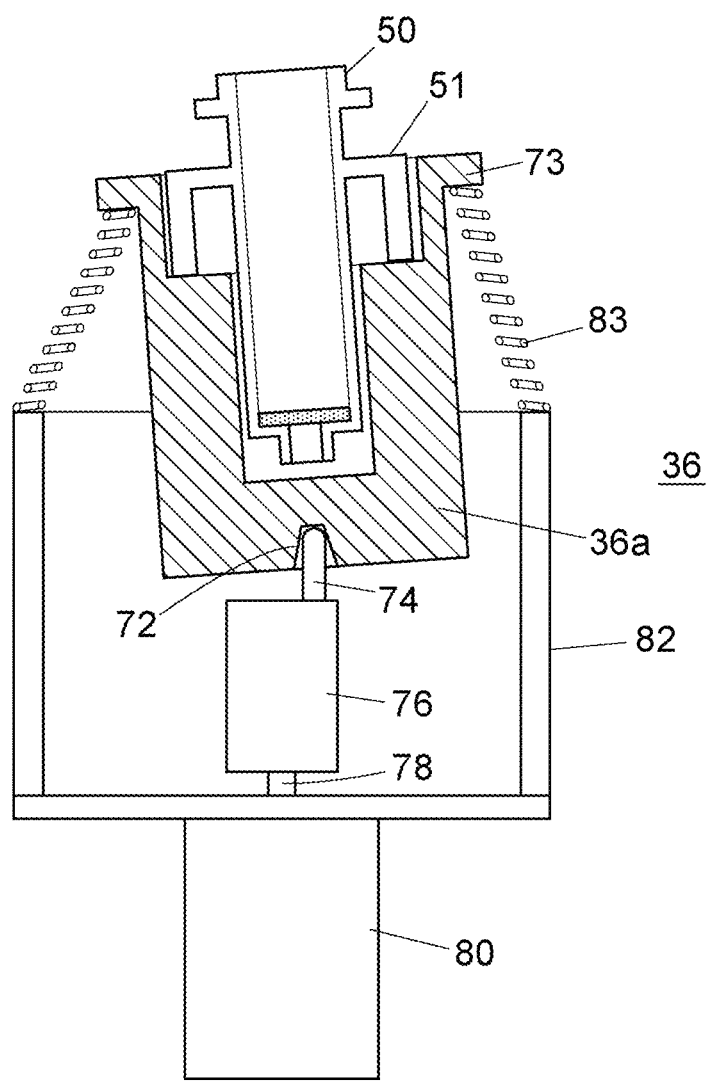
FIG. 6B is a cross-sectional configuration diagram showing an operation state of a stirring part.

Next, a structure of the stirring part 36 will be described with reference to FIGS. 6A and 6B. FIGS. 6A and 6B show one stirring port 36a of the stirring part 36.

The stirring port 36a of the stirring part 36 is a container which contains the separation device 50. The stirring port 36a is driven by a stirring mechanism provided below the stirring port 36a.

The stirring mechanism which drives the stirring port 36a will be described. A rotor 76 is placed below the stirring port 36a, and a driving shaft 74 which is vertically placed is attached in a position displaced with respect to a center of an upper surface of the rotor 76. An upper end of the driving shaft 74 is inserted into a supporting hole 72 provided in a lower surface of the stirring port 36a. The rotor 76 is supported by a rotation shaft 78 rotated by a motor 80, and driving of the motor 80 causes rotation of the rotor 76, which is followed by revolving of the driving shaft 74 in a horizontal plane.

A supporting flame 82 is attached to the motor 80. The supporting flame 82 includes a sidewall extending vertically upward from the motor 80 side, and one end of an elastic member 83 such as a coil spring is attached to an upper end of the sidewall. The other end of the elastic member 83 is attached to an outer surface of an upper portion of the stirring port 36a, and elastically holds the upper portion of the stirring port 36a. The elastic member 83 is provided in each of plural positions (four positions, for example) which are evenly spaced from each other and surround the stirring port 36a.

When the motor 80 is driven with the separation device 50 containing a sample and a reagent being contained in the stirring port 36a, the driving shaft 74 revolves in a horizontal plane, which is followed by revolving of a lower end of a supporting role 72, as shown in FIG. 6B. This causes stirring in the separation device 50 contained in the stirring port 36a, so that a sample and a reagent are mixed.

Referring back to FIG. 1, the preprocessing apparatus 1 includes a sample transfer part 42 for transferring a sample which is extracted to be in the collecting container 54, to a sample injecting apparatus (such as an automatic sampler, for example) placed adjacent to the preprocessing apparatus 1, at a lateral edge on a casing side. The sample transfer part 42 includes a moving part 44 which is caused to move along one line (as indicated by arrows in FIG. 1) in a horizontal plane by a driving mechanism including a rack-and-pinion mechanism. A transfer port 43 for setting the collecting container 54 containing an extracted sample is provided in an upper surface of the moving part 44.

While no sample is transferred to the sample injecting apparatus, the transfer port 43 is placed in a position along a track of the holding part 25 of the carrying arm 24 (a position indicated by a solid line in FIG. 1), and setting of the collecting container 54 in the transfer port 43 by the carrying arm 24, as well as retrieval of the collecting container 54 from the transfer port 43, is performed in this position.

In order to transfer a sample to the sample injecting apparatus, after the collecting container 54 containing an extracted sample is placed in the transfer port 43, the moving part 44 moves toward an outside of the preprocessing apparatus 1, and the transfer port 43 is placed in a position on a side where the adjacent sample injecting apparatus is provided (a position indicated by a broken line in FIG. 1). In this position, a nozzle for sampling which is provided in the sample injecting apparatus sucks a sample in the collecting container 54. When the sample injecting apparatus finishes sucking the sample, the moving part 44 returns to an original position (a position indicated by a solid line in FIG. 1), and the carrying arm 24 retrieves the collecting container 54. The collecting container 54 which is once used is carried to a disposal port 34 by the carrying arm 24, and is disposed of.

The preprocessing apparatus 1 includes the disposal port 34 for disposing of the separation device 50 and the collecting container 54 which are once used, in a position along a track of the holding part 25 of the carrying arm 24 near the dispensation port 32. Further, the preprocessing apparatus 1 includes a cleaning port 45 for cleaning the sampling nozzle 20a in a position along a track of the sampling nozzle 20a. Though not shown in the drawings, a cleaning port for cleaning the reagent addition nozzle 26a is provided in a position along a track of the reagent addition nozzle 26a.

Figure 7:
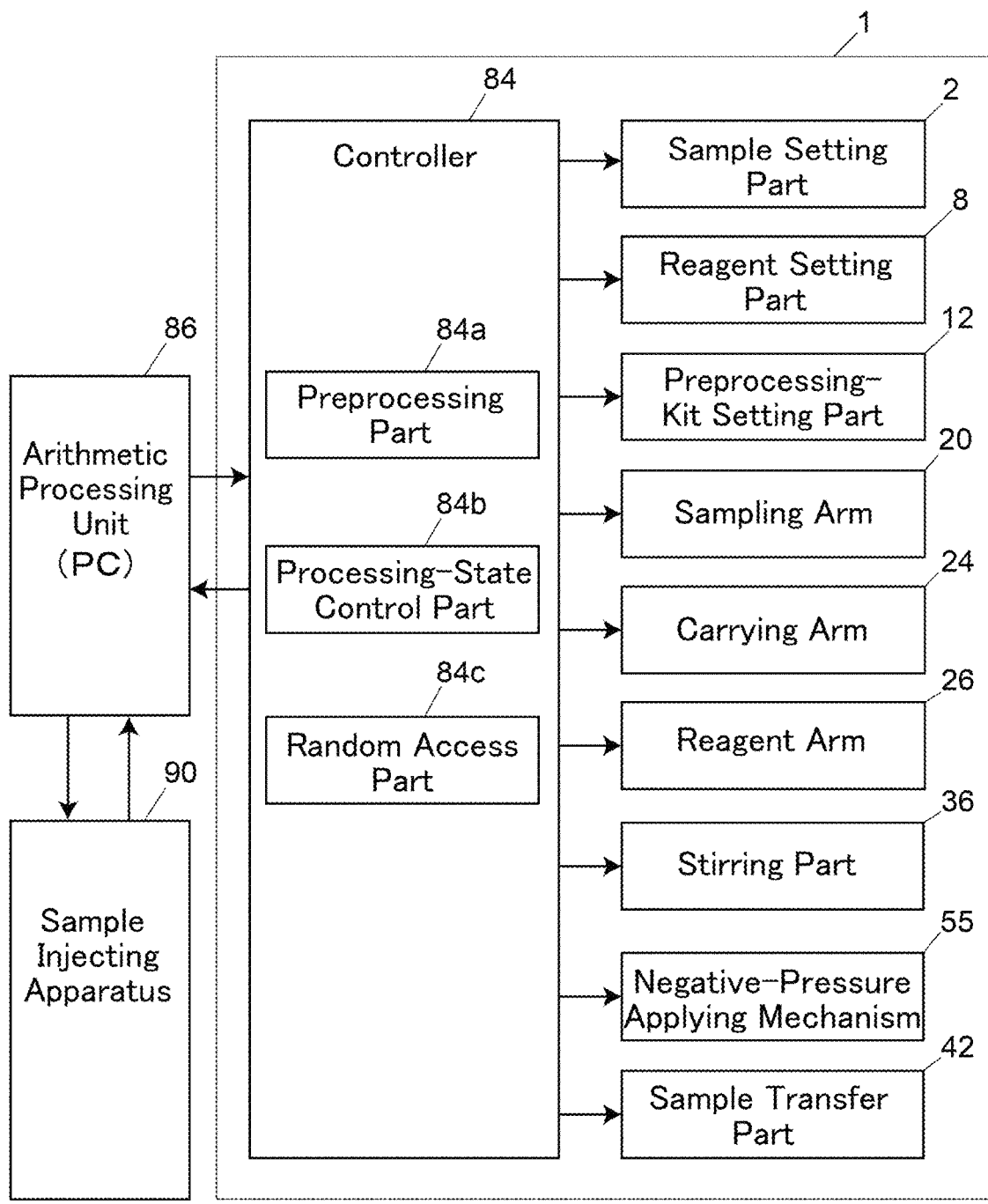
FIG. 7 is a block diagram showing a control system according to the embodiment.

Next, a control system of the preprocessing apparatus 1 will be described with reference to FIG. 7. In the following description, the term "port" means any of ports including the filtration port 30, the dispensation port 32, the stirring port 36a, the temperature adjustment ports 38 and 40, and the transfer port 43, in each of which the separation device 50 or the collecting container 54 is to be set.

Operations of the sample setting part 2, the reagent setting part 8, the preprocessing-kit setting part 12, the sampling arm 20, the carrying arm 24, the reagent arm 26, the stirring part 36, the sample transfer part 42, and the negative-pressure applying mechanism 55 which are provided in the preprocessing apparatus 1, are controlled by a controller 84. The controller 84 is implemented by a computer provided in the preprocessing apparatus 1 and software executed by the computer. The controller 84 is connected with an arithmetic processing unit 86 which is implemented by a personal computer (PC) or a dedicated computer, for example, and an analyst controls the preprocessing apparatus 1 via the arithmetic processing unit 86. The arithmetic processing unit 86 is connected with an analyzing apparatus (not shown) such as a liquid chromatograph analyzing a sample which has been subjected to preprocessing in the preprocessing apparatus 1, and is further connected with the sample injecting apparatus 90 injecting a sample into the analyzing apparatus, and those apparatuses operate in association with the preprocessing apparatus 1.

The controller 84 includes a preprocessing part 84a, a processing-state control part 84b and a random access part 84c. Each of those parts is a function fulfilled by execution of software in a computer forming the controller 84. As described above, a plurality of sample containers are set in the sample setting part 2, and samples contained in those sample containers are sequentially dispensed to the separation devices 50, and carried to ports respectively corresponding to preprocessing items which should be executed on the samples, respectively.

The random access part 84c is configured to confirm a processing item which should be next executed on each sample, check availability of a port corresponding to the confirmed processing item, and carry the separation device 50 or the collecting container 54 containing the sample to a port if the port is available. Also, in a case where there is no available port corresponding to the confirmed processing item, the separation device 50 or the collecting container 54 being processed is carried to the port as soon as a port becomes available. The random access part 84c is configured to check a processing state in each port, and control the carrying arm 24 in such away that the carrying arm 24 carries the separation device 50 which had been subjected to processing in a port, to another port where next processing is to be performed.

The processing-state control part 84b is configured to control availability of each port and a processing state in each port. Availability of each port can be controlled by remembering which of the ports is used for setting the separation device 50 or the collecting container 54. Also, a sensor which senses whether or not the separation device 50 or the collecting container 54 is set may be provided in each port so that availability of each port can be controlled based on a signal provided from the sensor. A processing state in each port can be controlled by checking whether or not a time required to perform processing in a certain port elapses from setting of the separation device 50 or the collecting container 54 in the certain port. A state of processing in the transfer port 43 (suction of a sample by the sample injecting apparatus 90) may be controlled by checking whether or not a signal indicating that suction of a sample is finished is received from the sample injecting apparatus 90.

Each of the ports is configured to perform predetermined processing in the port when the separation device 50 or the collecting container 54 is set in the port.

It is noted that while two filtration ports 30, three stirring ports 36a, and four temperature adjustment ports 38 or 40 are provided, priorities are assigned to the ports which are provided to perform the same processing, and the random access part 84c is configured to use those ports in descending order of priority. For example, in a case where both of the two filtration ports 30 are available in filtering a sample, the collecting container 54 is set in one of the two filtration ports 30 which has a higher priority, and the separation device 50 is set on the collecting container 54.

Figure 8:
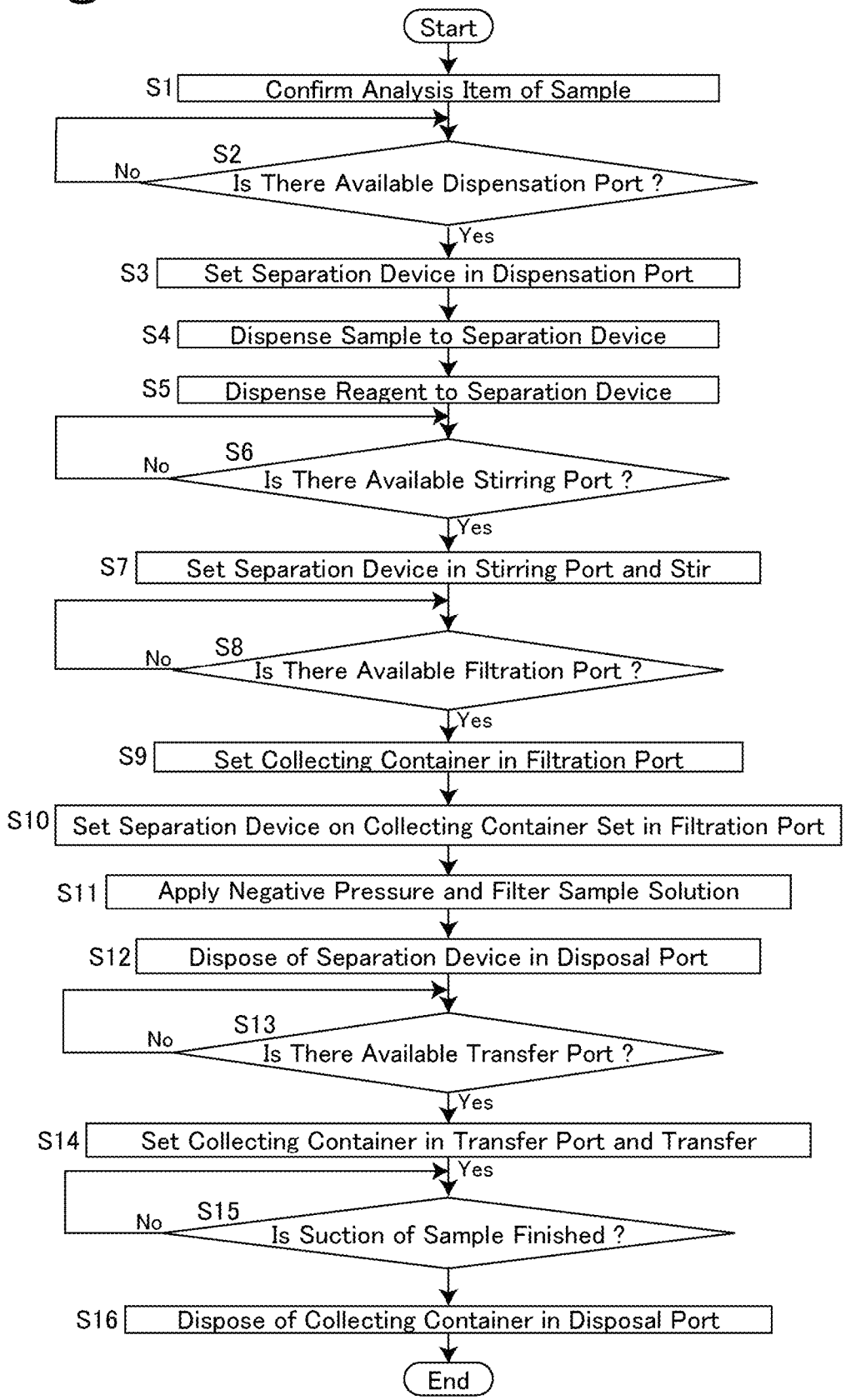
FIG. 8 is a flow chart showing an example of operations for preprocessing according to the embodiment.

An example of operations for preprocessing performed on one sample according to this embodiment will be described with reference to a flow chart of FIG. 8 together with FIG. 1. The flow chart of FIG. 8 shows only a flow of operations for preprocessing performed on one sample, and the operations for preprocessing are performed in parallel with and concurrently with, but independently of, operations for preprocessing performed on another sample. "To perform operations for preprocessing in parallel and concurrently, but independently" means that while filtration processing or stirring processing is performed on a certain sample in the filtration port 30 or the stirring port 36a, the carrying arm 24 carries the separation device 50 or the collecting container 54 containing a different sample to another port, where processing is performed on the different sample independently.

First, an analysis item which is previously designated by an analyst for a sample is confirmed (step S1), and a preprocessing item necessary for executing the confirmed analysis item is determined. Whether or not the dispensation port 32 is available is checked If the dispensation port 32 is available, the carrying arm 24 takes out the separation device 50 being unused in which the sample is to be contained, from the preprocessing-kit setting part 12, and sets the separation device 50 in the dispensation port 32 (steps S2 and S3). Though the separation device 50 and the collecting container 54 are set in the preprocessing-kit setting part 12 with the separation device 50 and the collecting container 54 being stacked (in a state shown in FIG. 2C), the carrying arm 24 holds only the separation device 50 being on the collecting container 54 with the use of the holding part 25, and carries the separation device 50 to the dispensation port 32.

The sampling nozzle 20a dispenses the sample to the separation device 50 (step S4). After dispensing the sample to the separation device 50, the sampling nozzle 20a is cleaned in the cleaning port 45, and gets ready for dispensation of a next sample. The reagent addition nozzle 26a takes a reagent related to preprocessing which should be performed on the sample dispensed to the separation device 50, from the reagent container 10, and dispenses the reagent to the separation device 50 in the dispensation port 32 (step S5). Additionally, dispensation of a reagent to the separation device 50 may be performed before dispensation of the sample. Further, a reagent dispensation port for dispensing a reagent may be provided in a different position from that of the dispensation port 32 so that the carrying arm 24 can set the separation device 50 in the reagent dispensation port, for dispensation of a reagent in the different position.

After the sample and the reagent are dispensed to the separation device 50, availability of the stirring port 36a is checked (step S6). If the stirring port 36a is available, the carrying arm 24 shifts the separation device 50 from the dispensation port 32 to the available stirring port 36a, and stirring is performed (step S7). This stirring processing is performed for a certain period of time which is previously determined, so that the sample and the reagent in the separation device 50 are mixed. During this stirring processing, availability of the filtration port 30 is checked (step S8), and the carrying arm 24 sets the collecting container 54 in the filtration port 30 if the filtration port 30 is available (step S9). The collecting container 54 set in the filtration port 30 is the collecting container 54 which is paired with the separation device 50 in which stirring is being performed in the stirring port 36a, and is the collecting container 54 set in the preprocessing-kit setting part 12 with the separation device 50 in which stirring is being performed, being stacked thereon. Additionally, during this stirring processing, the carrying arm 24 can carry the separation device 50 or the collecting container 54 for another sample.

Figure 4B:
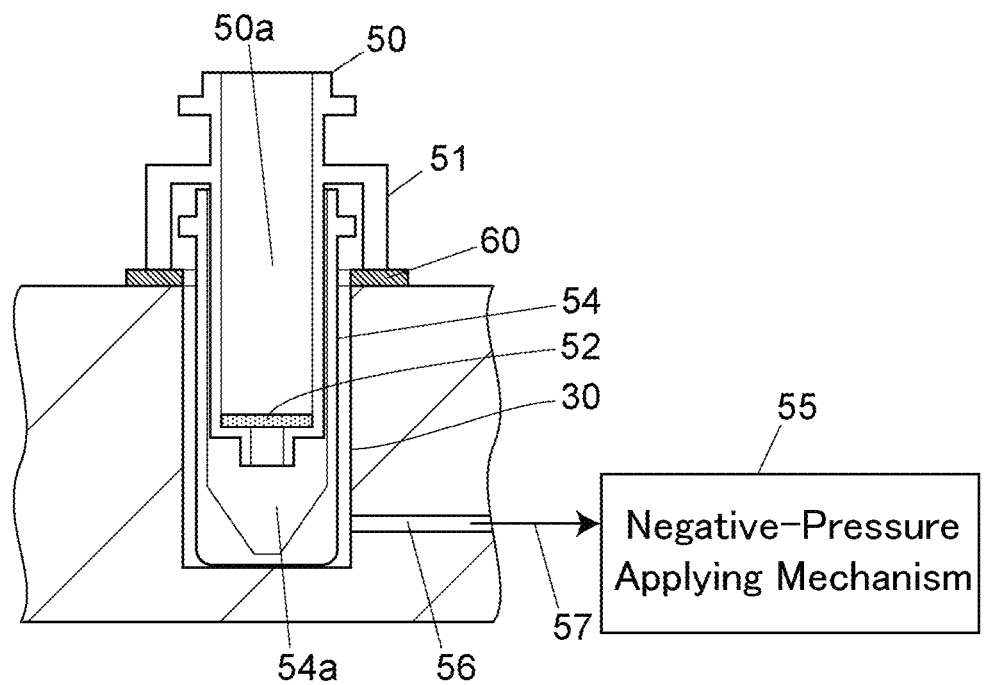
FIG. 4B is a cross-sectional configuration diagram showing a state where a preprocessing kit is set in a filtration port.

After stirring processing is finished in the stirring part 36, the carrying arm 24 sets the separation device 50 on the collecting container 54 in the filtration port 30, to bring about a state shown in FIG. 4B (step S10). The negative-pressure applying mechanism 55 applies a predetermined negative pressure to the filtration port 30 in which the separation device 50 and the collecting container 54 are contained. As a result of the separation device 50 and the collecting container 54 being maintained for a certain period of time in the filtration port 30 which is under a negative pressure, the sample in the separation device 50 is filtered and extracted to be in the collecting container 54 (step S11).

Also during this filtration processing, the carrying arm 24 can carry another separation device 50 or another collecting container 54.

Additionally, though not incorporated in the above-described operations for preprocessing, a temperature treatment in which a sample in the separation device 50 is maintained at a predetermined temperature for a certain period of time after the sample is stirred in the separation device 50, may be incorporated in some cases. In such a case, after stirring processing is finished, availability of the temperature adjustment port 38 is checked, and the separation device 50 is set in the temperature adjustment port 38 if the temperature adjustment port 38 is available. Then, after a certain period of time elapses, the separation device 50 is shifted from the temperature adjustment port 38, to be set on the collecting container 54 in the filtration port 30.

After filtration processing of the sample is finished, the three-way valve 64 (refer to FIG. 5) is switched so that an atmospheric pressure is maintained in the filtration port 30, and the holding part 25 of the carrying arm 24 takes out the separation device 50 which is used, from the filtration port 30, and disposes of the separation device 50 in the disposal port 34 (step S12).

Thereafter, availability of the transfer port 43 is checked. If the transfer port 43 is available, the carrying arm 24 carries the collecting container 54 in the filtration port 30 to the transfer part 42, and sets the collecting container 54 in the transfer port 43. When the collecting container 54 is set in the transfer port 43, the moving part 44 is caused to move to a position (indicated by a broken line in FIG. 1) on a side where the adjacently-placed sample injecting apparatus 90 (refer to FIG. 7) is provided, so that the collecting container 54 is transferred to a side where the sample injecting apparatus 90 is provided (step S14). On a side where the sample injecting apparatus 90 is provided, a sampling nozzle sucks the sample in the collecting container 54 transferred by the transfer part 42 (step S15). The moving part 44 stops at a position on a side where the sample injecting apparatus 90 is provided until the sample injecting apparatus 90 finishes sucking the sample, and the moving part 44 returns to an original position (indicated by a solid line in FIG. 1) when a signal indicating that suction of the sample is finished is received from the sample injecting apparatus 90.

After transfer of the sample is finished, the carrying arm 24 retrieves the collecting container 54 which is used, from the transfer port 43, and disposes of the collecting container 54 in the disposal port 34.

Additionally, after filtration processing of the sample is finished, a temperature treatment in which the sample which is extracted to be in the collecting container 54 is maintained at a predetermined temperature for a certain period of time is performed, in some cases. In such a case, availability of the temperature adjustment port 40 is checked, and the collecting container 54 is set in the temperature adjustment port 40 if the temperature adjustment port 40 is available. Then, after a certain period of time elapses, the collecting container 54 is shifted from the temperature adjustment port 40 to the transfer port 43, where the sample is transferred.

Figure 9:
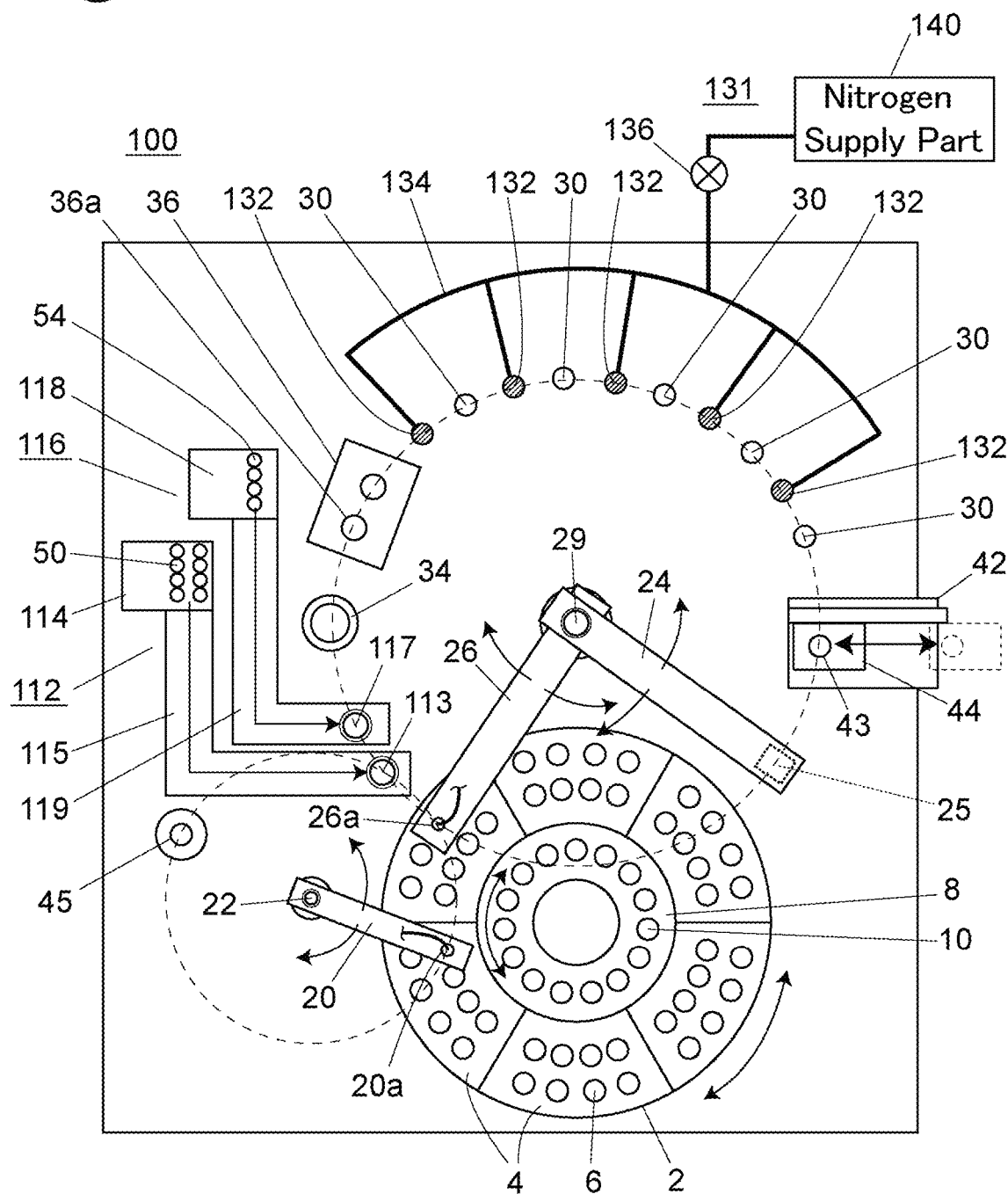
FIG. 9 is a plan view showing a different embodiment of a preprocessing apparatus.

Another embodiment of a preprocessing apparatus will be described with reference to FIG. 9. It is noted that in FIG. 9, the same structures as in FIG. 1 are denoted by the same reference symbols, and description about such structures will be omitted in the following.

A preprocessing apparatus 100 includes a separation-device supply part 112 and a collecting-container supply part 116 as preprocessing-kit setting parts.

The separation-device supply part 112 automatically sets the separation device 50 in a separation-device setting port 113 which is provided in a position along a track of the holding part 25 of the carrying arm 24 and along a track of the sampling nozzle 20a of the sampling arm 20. The separation-device supply part 112 includes a separation-device holding part 114 in which a plurality of separation devices 50 being unused are held. The separation-device holding part 114 is placed at a higher level than the separation-device setting port 113, and includes a slope 115 which is inclined so as to descend from the separation-device holding part 114 to the separation-device setting port 113, between the separation-device holding part 114 and the separation-device setting port 113. When one of the separation devices 50 which are held by the separation-device holding part 114 is released from a hold, the released separation device 50 slides on the slope 115 due to gravity, and is set in the separation-device setting port 113.

The collecting-container supply part 116 automatically sets the collecting container 54 in a collecting-container setting port 117 which is provided in a position along a track of the holding part 25 of the carrying arm 24. The collecting-container supply part 116 includes a collecting-container holding part 118 in which a plurality of collecting containers 54 being unused are held. The collecting-container holding part 118 is placed at a higher level than the collecting-container setting port 117, and includes a slope 119 which is inclined so as to descend from the collecting-container holding part 118 to the collecting-container setting port 117, between the collecting-container holding part 118 and the collecting-container setting port 117. When one of the collecting containers 54 which are held by the collecting-container holding part 118 is released from a hold, the released collecting container 54 slides on the slope 119 due to gravity, and is set in the collecting-container setting port 117.

According to this embodiment, the filtration ports 30 are provided in plural positions along a track of the holding part 25 of the carrying arm 24, and further, drying/solidifying-gas supply nozzles 132 are placed in respective positions near the filtration ports 30 and along a track of the holding part 25 of the carrying arm 24. The drying/solidifying-gas supply nozzles 132 form a part of a drying/solidifying mechanism 131 which blows a nitrogen gas as a drying/solidifying gas to a sample which is extracted to be in the collecting container 54 in the filtration port 30, to dry and solidify the sample. A nitrogen gas is supplied to each of the drying/solidifying-gas supply nozzles 132 from a nitrogen supply part 140 through a drying/solidifying-gas supply path 134 as needed. A flow rate of nitrogen gas supplied from the nitrogen supply part 140 is controlled by a valve 136.

Figure 10A:
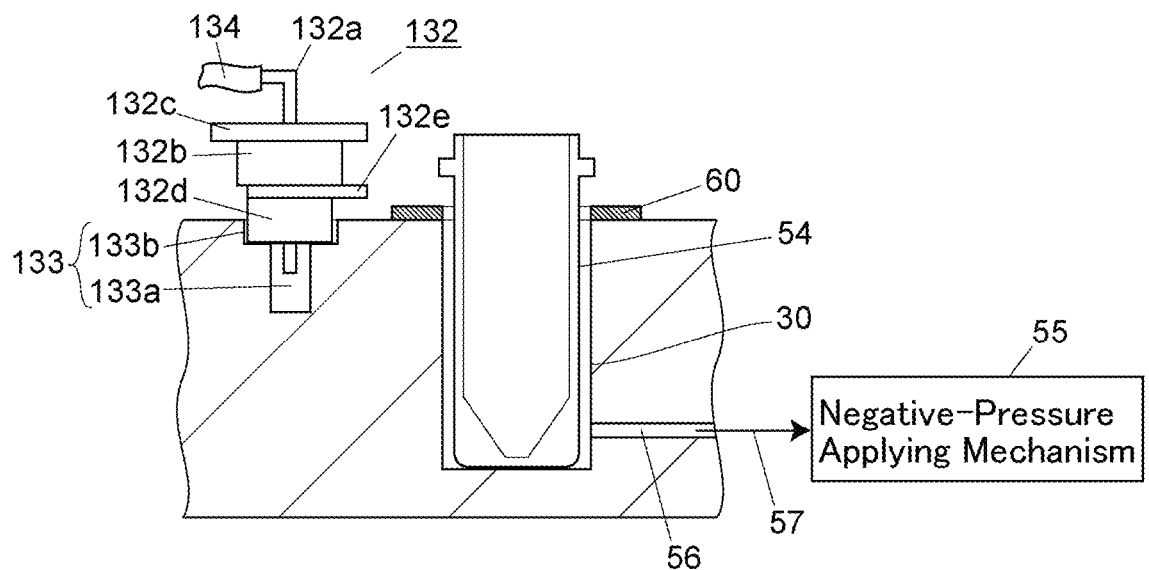
FIG. 10A is a cross-sectional configuration diagram showing a part of a drying/solidifying mechanism together with a filtration port.

An example of the drying/solidifying-gas supply nozzle 132 will be described with reference to FIGS. 10A and 10B.

A nozzle setting port 133 is provided near each of the filtration ports 30. The nozzle setting port 133 includes a hole 133a into which a tip of the drying/solidifying-gas supply nozzle 132 of the drying/solidifying mechanism 131 is inserted, and a depression 133b provided at an edge of the hole 133a. The drying/solidifying-gas supply nozzle 132 includes a tip-side body 132d which has a shape fitted into the depression 133b, on a tip side, and as a result of the tip-side body 132d being fitted into the depression 133b, the drying/solidifying-gas supply nozzle 132 is set with a nozzle tip being oriented vertically downward in the nozzle setting port 133.

The drying/solidifying-gas supply nozzle 132 includes: a first flange part 132c which is engaged with the finger parts 46 (refer to FIG. 3) of the holding part 25 of the carrying arm 24, on a base-end side in a pipe 132a to which a tube forming the drying/solidifying-gas supply path 134 is attached; a base-side body 132b in a position closer to a nozzle tip than the flange part 132c; and a second flange part 132e in a position more closer to a nozzle tip. The holding part 25 of the carrying arm 24 carries the drying/solidifying-gas supply nozzle 132 by holding the first flange part 132c with the finger parts 46.

Figure 10B:
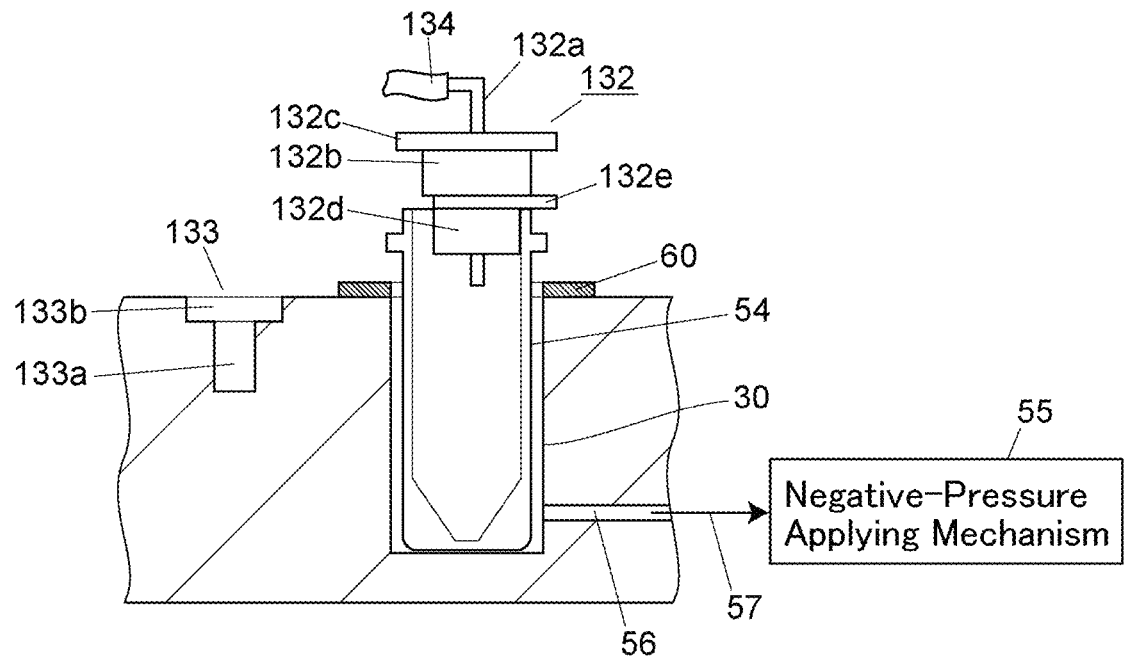
FIG. 10B is a cross-sectional view showing a state where a drying/solidifying-gas supply nozzle is placed on a collecting container.

In order to dry and solidify a sample in the collecting container 54, as shown in FIG. 10B, the carrying arm 24 sets the drying/solidifying-gas supply nozzle 132 in an opening in an upper surface of the collecting container 54, and a nitrogen gas is vertically blown to the sample in the collecting container 54. As a result of the drying/solidifying-gas supply nozzle 132 being set in the opening in the upper surface of the collecting container 54, the second flange part 132e of the drying/solidifying-gas supply nozzle 132 comes into contact with an edge of the opening of the collecting container 54, so that the base-side body 132b and the first flange part 132c of the drying/solidifying-gas supply nozzle 132 can be kept exposed above the collecting container 54. Consequently, after drying/solidifying processing is finished, the holding part 25 of the carrying arm 24 can hold the drying/solidifying-gas supply nozzle 132, and put the drying/solidifying-gas supply nozzle 132 back to the nozzle setting port 133.

The drying/solidifying-gas supply nozzle 132 blows a nitrogen gas to the extracted sample which is provided from the separation device 50, to achieve concentration or drying/solidifying, (hereinafter, either will be referred to as "drying/solidifying processing") of the sample. In performing drying/solidifying processing, as shown in FIG. 10B, the carrying arm 24 carries the drying/solidifying-gas supply nozzle 132 to a position above the collecting container 54 so that the flange part 132e of the drying/solidifying-gas supply nozzle 132 comes into contact with the edge of the upper surface of the collecting container 54. Accordingly, a tip of the drying/solidifying-gas supply nozzle 132 is kept oriented vertically downward without having the drying/solidifying-gas supply nozzle 132 held by the carrying arm 24. Drying/solidifying processing is performed on a sample in such a state, and during this drying/solidifying processing, the carrying arm 24 can perform another processing.

Figure 11:
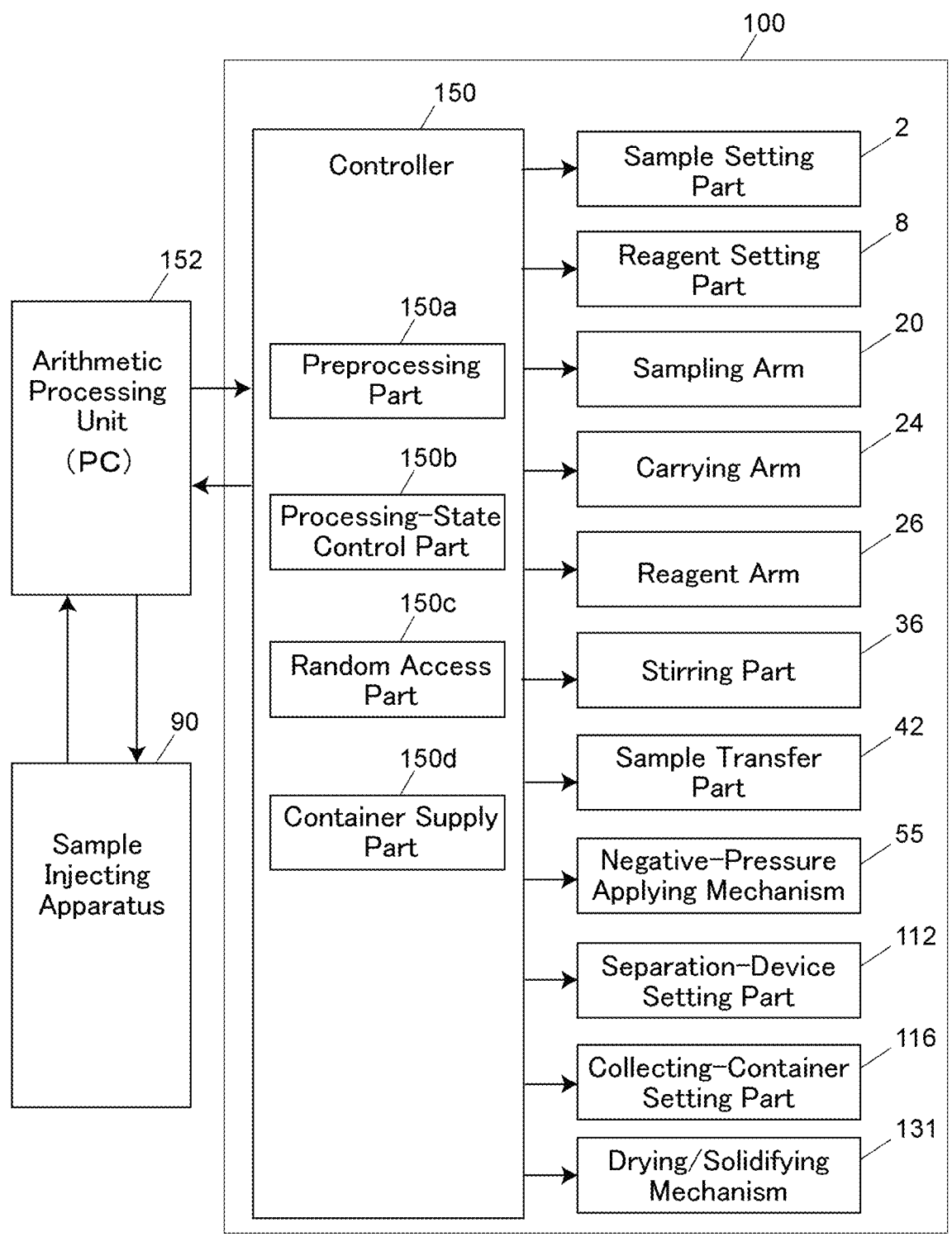
FIG. 11 is a block diagram showing a control system according to the different embodiment.

FIG. 11 shows a control system according to this embodiment.

A controller 150 controls operations of the separation-device supply part 112, the collecting-container supply part 116, and the drying/solidifying mechanism 131, as well as operations of the sample setting part 2, the reagent setting part 8, the preprocessing-kit setting part 12, the sampling arm 20, the carrying arm 24, the reagent arm 26, the stirring part 36, the sample transfer part 42, and the negative-pressure applying mechanism 55. The controller 150 is implemented by a computer provided in the preprocessing apparatus 100 and software executed by the computer. The controller 150 is connected with an arithmetic processing unit 152 implemented by a personal computer (PC) or a dedicated computer, for example, and an analyst controls the preprocessing apparatus 100 via the arithmetic processing unit 152. The arithmetic processing unit 152 is connected with the sample injecting apparatus 90.

The controller 150 includes a preprocessing part 150a, a processing-state control part 150b, a random access part 150c, and a container supply part 150d. Each of those parts is a function fulfilled by execution of software in a computer forming the controller 150. The preprocessing part 150a, the processing-state control part 150b, and the random access part 150c have the same functions as the preprocessing part 84a, the processing-state control part 84b, and the random access part 84c in FIG. 7, respectively. The container supply part 150d is configured to control the separation-device supply part 112 and the collecting-container supply part 116 in such a way that the separation device 50 is set in the separation-device setting port 113, and the collecting container 54 is set in the collecting-container setting port 117 at appropriate points in time.

Figure 12:
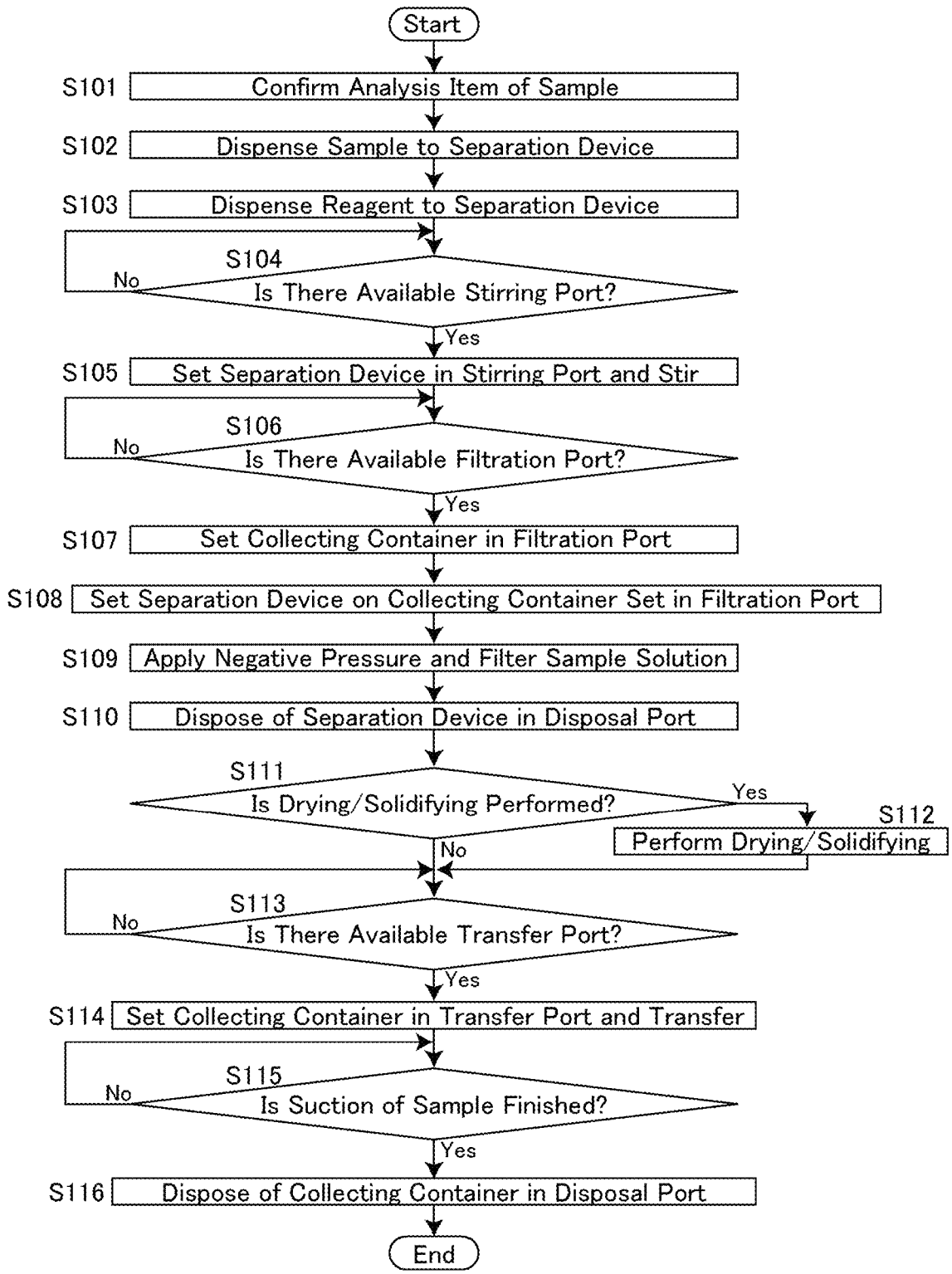
FIG. 12 is a flow chart showing an example of operations for preprocessing according to the different embodiment.

An example of operations for preprocessing performed on one sample according to this embodiment will be described with reference to a flow chart of FIG. 12 together with FIG. 9. The flow chart of FIG. 12, in the same way as the flow chart of FIG. 8, shows only a flow of operations for preprocessing preformed on one sample, and the operations for preprocessing are performed in parallel with and concurrently with, but independently of, operations for preprocessing performed on another sample.

First, an analysis item which is previously designated by an analyst for a sample is confirmed (step S101), and a preprocessing item necessary for executing the confirmed analysis item is determined. The separation-device supply part 112 sets the separation device 50 being unused in the separation-device setting port 113, and the sampling nozzle 20a dispenses the sample to the set separation device 50 (step S102). After dispensing the sample to the separation device 50, the sampling nozzle 20a is cleaned in the cleaning port 45, and prepares for dispensation of a next sample. The reagent addition nozzle 26a takes a reagent related to preprocessing which should be performed on the sample dispensed to the separation device 50, from the reagent container 10, and dispenses the reagent to the separation device 50 in the separation-device setting port 113 (step S103).

Additionally, dispensation of a reagent to the separation device 50 may be performed before dispensation of the sample. Also, the reagent dispensation port for dispensing a reagent may be provided in a different position so that the carrying arm 24 can set the separation device 50 in the reagent dispensation port, to achieve dispensation of a reagent in the different position.

After the sample and the reagent are dispensed to the separation device 50, availability of the stirring port 36a is checked (step S104). If the stirring port 36a is available, the carrying arm 24 shifts the separation device 50 from the separation-device setting port 113 to the available stirring port 36a, and stirring is performed (step S105). This stirring processing is performed for a certain period of time which is previously determined, so that the sample and the reagent in the separation device 50 are mixed. During this stirring processing, availability of the filtration port 30 is checked (step S106), and the carrying arm 24 carries the collecting container 54 which is unused and set in the collecting-container setting port 117, to the filtration port 30, and sets the collecting container 54 if the filtration port 30 is available (step S107). During this stirring processing, the carrying arm can carry the separation device 50 or the collecting container 54 for another sample.

After stirring processing is finished in the stirring part 36, the carrying arm 24 sets the separation device 50 on the collecting container 54 in the filtration port 30 (step S108). The negative-pressure applying mechanism 55 applies a predetermined negative pressure to the filtration port 30 containing the separation device 50 and the collecting container 54. As a result of the separation device 50 and the collecting container 54 being maintained for a certain period of time in the filtration port 30 which is under a negative pressure, the sample in the separation device 50 is filtered and extracted to be in the collecting container 54 (step S109). Also during this filtration processing, the carrying arm 24 can carry another separation device 50 or another collecting container 54.

After filtration processing of the sample is finished, the three-way valve 64 (refer to FIG. 5) is switched so that an atmospheric pressure is maintained in the filtration port 30, and the holding part 25 of the carrying arm 24 takes out the separation device 50 which is used, from the filtration port 30, and disposes of the separation device 50 in the disposal port 34 (step S110). Thereafter, in a case where the sample which is extracted to be in the collecting container 54 should be dried and solidified, the drying/solidifying-gas supply nozzle 132 is set in an opening in an upper surface of the collecting container 54, and drying/solidifying is performed (steps S111 and S112). Also during this drying/solidifying processing, the carrying arm 24 can carry the separation device 50 or the collecting container 54 for another sample.

After filtration processing of the sample is finished in a case where drying/solidifying of a sample is not performed, or after drying/solidifying of the sample is finished in a case where the sample should be dried and solidified, availability of the transfer part 43 is checked, and the carrying arm 24 carries the collecting container 54 in the filtration port 30 to the transfer part 42 and sets the collecting container 54 in the transfer port 43 if the transfer port 43 is available. Operations for transfer of the sample and operations for disposal of the collecting container 54 which are to be performed thereafter are the same as the operations for preprocessing which have been described above with reference to the flow chart of FIG. 8.

The above-described embodiments are mere examples of preferred embodiments of the present invention, and positions and the numbers of ports such as the filtration port 30, the stirring port 36a, the temperature adjustment ports 38 and 40, and the transfer port 43 can be appropriately changed as needed.

DESCRIPTION OF REFERENCE SIGNS 1, 100: Preprocessing apparatus
2: Sample setting part
4: Sample rack
6: Sample container
8: Reagent setting part
10: Reagent container
12: Preprocessing-kit setting part
20: Sampling arm
20a: Sampling nozzle
22, 29: Shaft
24: Carrying arm
25: Holding part
26: Reagent arm
26a: Reagent addition nozzle
30: Filtration port
32: Dispensation port
34: Disposal port
36: Stirring part
36a: Stirring port
38: Temperature adjustment port for separation device
40: Temperature adjustment port for collecting container
42: Transfer part
43: Transfer port
44: Moving part
45: Cleaning port
50: Separation device
50a: Internal space of separation device
50b: Opening of separation device
50c: Flange part of separation device
50d: Extraction outlet
51: Skirt part
52: Separation agent
54: Collecting container
54a: Internal space of collecting container
54b: Opening of collecting container
54c: Flange part of collecting container
55: Negative pressure applying mechanism
56: Flow path
57: Flow path
58: Vacuum pump
60: Sealing member
62, 68: Pressure sensor
64, 70: Three-way valve
72: Supporting hole
73: Upper end of Stirring port
74: Driving shaft
76: Rotor
78: Rotation shaft
80: Motor
82: Supporting flame
83: Elastic member
84, 150: Controller
84a, 150a: Preprocessing part
84b, 150b: Processing-state control part
84c, 150c: Random access part
86, 152: Arithmetic processing unit
90: Sample injecting apparatus
112: Separation-device supply part
113: Separation-device setting port
114: Separation-device holding part
115, 119: Slope
116: Collecting-container supply part
118: Collecting-container holding part
131: Drying/solidifying mechanism
132: Drying/solidifying-gas supply nozzle
133: Nozzle setting port
134: Pipe for drying/solidifying-gas supply nozzle
136: Valve for controlling flow rate of drying/solidifying gas
140: Nitrogen supply part

The invention claimed is:

1. A controlling method of a preprocessing apparatus for preprocessing of one or more samples in preparation for sample analysis, wherein
the preprocessing apparatus comprises:
a preprocessing container which is prepared for each sample of the one or more samples and includes a separation device and a collecting container,
a carrying mechanism, which includes a holding part configured to hold the separation device and the collecting container of the preprocessing container individually, the carrying mechanism carrying the separation device and the collecting container individually by moving the holding part;
a preprocessing-container setting part configured to set the preprocessing container in a position on a path of the holding part;
a plurality of stirring ports, each having a stirring mechanism, configured to receive the separation device from the holding part of the carrying mechanism and provided for executing a stirring processing to the separation device, a plurality of filtration ports configured to receive the collecting device from the holding part of the carrying mechanism and provided for executing a filtration processing which is a process to extract the sample from the separation device which is set on the collecting container to the collecting container, wherein the separation device has a pre-extraction internal space containing the sample, and includes a separation agent or a separation membrane for separating a specific component in the sample from the sample in the pre-extraction internal space, and an extraction outlet provided below the separation agent or the separation membrane, through which the sample in the pre-extraction internal space is extracted, wherein the controlling method comprises:

determining the preprocessing procedure to be executed to each sample based on analysis items for each sample previously designated by an analyst;

controlling preprocessing performed in each of the plurality of stirring ports and the plurality of filtration ports;

controlling availability of each of the plurality of stirring ports and the plurality of filtration ports by remembering the plurality of stirring ports and the plurality of filtration ports that have received the separation device or collecting container of the preprocessing container or by using sensors provided to each of the plurality of stirring ports and the plurality of filtration ports that senses presence of the separation device or collecting container of the preprocessing container within the respective stirring ports and the respective filtration ports;

wherein the preprocessing procedure to be executed to each sample is including the filtration processing and the stirring processing, wherein the controlling method further comprises:

checking availability of the plurality of stirring ports, setting the separation device containing the sample in one of the plurality of stirring ports based on a determination that the one of the stirring ports is available;

executing the stirring processing to the separation device set in the one of the stirring ports;

while the stirring processing to the separation device is executed, checking availability of the plurality of filtration ports and setting the collecting container in one of the plurality of filtration ports based on a determination that the one of the filtration ports is available;

after the stirring processing to the separation device is completed, setting the separation device, to which the stirring processing has been executed, on the collecting container set in the one of the filtration ports, and executing the filtration processing by applying negative pressure to the sample in the separation device set on the collecting container so that the sample is extracted from the separation device to the collecting container.

2. The controlling method according to claim 1, the preprocessing apparatus further comprising:

a pressure applying device used for applying a pressure to the sample in the preprocessing container set in a filtration port of the plurality of filtration ports so that the sample in the separation device set in the filtration port is extracted to form the extracted sample to be provided from the extraction outlet to the collecting container through the separation agent or the separation membrane.

3. The controlling method according to claim 2, wherein each of the separation device and the collecting container includes a flange part which is a circumferential expansion of an outer circumferential surface, and the carrying mechanism is configured to carry the separation device and the collecting container with the holding part being engaged with the flange part of each of the separation device and the collecting container and with the separation device and the collecting container being carried separately by the holding part.

4. The controlling method according to claim 2, wherein each stirring mechanism is used for causing the separation device set in each of the plurality of stirring ports to periodically move in a horizontal plane, to stir the sample in the separation device.

5. The controlling method according to claim 4, wherein each stirring mechanism is provided individually for each stirring port of the plurality of stirring ports, respectively.

6. The controlling method according to claim 2, the preprocessing apparatus further comprises a sample transfer part which includes a transfer port for receiving the collecting container containing the extracted sample which is provided from the separation device, and a port moving mechanism for moving the transfer port towards an outside of the preprocessing apparatus to an end portion of the sample transfer part, the sample transfer part placing the collecting container at the end portion of the sample transfer part by moving the transfer port, in which the collecting container is set, towards the outside of the preprocessing apparatus.

7. The controlling method according to claim 2, the preprocessing apparatus further comprises a drying/solidifying mechanism, which is configured to blow a drying/solidifying gas, serving as a third type of the preprocessing devices for individually supplying a drying/solidifying gas to the collecting container set in the filtration port, wherein the third type of the preprocessing devices is configured to perform, after extraction processing is performed on the sample to form the extracted sample which is required to be dried and solidified, drying/solidifying processing in which the drying/solidifying gas is blown to the extracted sample in the collecting container.

8. The controlling method according to claim 7, wherein the drying/solidifying mechanism comprises a plurality of drying/solidifying-gas supply nozzles so as to have a drying/solidifying-gas supply nozzle of the plurality of drying/solidifying-gas supply nozzles provided to each of the filtration ports, respectively, each of the plurality of drying/solidifying-gas supply nozzles spouting a drying/solidifying gas from a tip, wherein the third type of the preprocessing devices is configured to perform drying/solidifying processing in which the carrying mechanism places the drying/solidifying-gas supply nozzle in an opening in an upper surface of the collecting container in the corresponding filtration port, and a drying/solidifying gas is blown to the extracted sample in the collecting container from the tip of the drying/solidifying-gas supply nozzle.

9. The controlling method according to claim 1, the preprocessing apparatus further comprises:

a dispensation port, provided in a position on the path of the holding part, configured to receive the separation device from the holding part of the carrying mechanism;

a sample setting part configured to hold a plurality of sample containers each containing a bulk sample of one or more bulk samples and place a desired sample container in a predetermined sampling position by moving the plurality of sample containers in a horizontal plane; and a sampling part configured to suck a portion of a bulk sample as the sample from one of the plurality of the sample containers is placed in the sampling position, and dispenses the sample to the separation device set in the dispensation port.

10. The controlling method according to claim 9, wherein
the sampling part includes a sampling arm configured to hold a nozzle, sucking and dispensing the sample, on an end of the sampling arm,
the sampling arm is connected to a vertical shaft at a base end of the sampling arm, and
the sampling arm rotates about the vertical shaft in a horizontal plane to move the nozzle in such a manner that the nozzle makes an arc-shaped path.

11. The controlling method according to claim 9, the preprocessing apparatus further comprises:
a reagent setting part configured to hold a plurality of reagent containers each containing a bulk reagent to be added to each of the respective one or more samples;
a reagent arm that is configured to place a desired reagent container in a predetermined reagent taking position by moving the reagent containers in a horizontal plane; and
a reagent addition part configured to suck a portion of a reagent as the reagent from a reagent container placed in the predetermined reagent taking position, and dispenses the reagent to the separation device set in the dispensation port.

12. The controlling method according to claim 11, wherein
the reagent addition part includes the reagent arm configured to hold a nozzle, sucking and dispensing the reagent, on an end of the reagent arm,
the reagent arm is connected to a vertical shaft at a base end of the reagent arm, and
the reagent arm rotates about the vertical shaft in a horizontal plane to move the nozzle in such a manner that the nozzle makes an arc-shaped path.

13. The controlling method according to claim 1, wherein
the carrying mechanism includes a carrying arm which includes the holding part on an end of the carrying arm,
the carrying arm is connected to a vertical shaft at a base end of the carrying arm, and
the carrying arm rotates about the vertical shaft in a horizontal plane to move the holding part in such a manner that the holding part makes an arc-shaped path.

* * * * *